(12) United States Patent
Jeon et al.

(10) Patent No.: US 8,199,116 B2
(45) Date of Patent: Jun. 12, 2012

(54) DISPLAY PANEL, DISPLAY DEVICE HAVING THE SAME AND METHOD OF DETECTING TOUCH POSITION

(75) Inventors: Jin Jeon, Suwon-si (KR); Hyung-Guel Kim, Yongin-si (KR); Jun-Ho Song, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 797 days.

(21) Appl. No.: 11/518,707

(22) Filed: Sep. 11, 2006

(65) Prior Publication Data

US 2007/0070047 A1    Mar. 29, 2007

(30) Foreign Application Priority Data

Sep. 26, 2005 (KR) .................. 10-2005-0089212

(51) Int. Cl.
*G09G 5/00* (2006.01)
(52) U.S. Cl. .................................. 345/173
(58) Field of Classification Search ............. 345/98, 345/102, 173
See application file for complete search history.

(56) References Cited

U.S. PATENT DOCUMENTS

| | | | | |
|---|---|---|---|---|
| 2004/0041796 A1* | 3/2004 | Lee | | 345/173 |
| 2004/0056845 A1* | 3/2004 | Harkcom et al. | | 345/173 |
| 2004/0150629 A1* | 8/2004 | Lee | | 345/173 |
| 2004/0189587 A1* | 9/2004 | Jung et al. | | 345/102 |
| 2004/0196269 A1* | 10/2004 | Dotson | | 345/173 |
| 2005/0206624 A1* | 9/2005 | Li | | 345/173 |
| 2006/0077186 A1* | 4/2006 | Park et al. | | 345/173 |

FOREIGN PATENT DOCUMENTS

| | | |
|---|---|---|
| JP | 09-080467 A | 3/1997 |
| JP | 2002-287660 A | 10/2002 |
| KR | 10-2003-0055990 | 7/2003 |
| KR | 10-2005-0087414 | 8/2005 |

* cited by examiner

*Primary Examiner* — Quan-Zhen Wang
*Assistant Examiner* — Tony Davis
(74) *Attorney, Agent, or Firm* — Cantor Colburn LLP

(57) ABSTRACT

A display panel includes an array substrate and an opposite substrate. The array substrate includes pixels, first signal lines, and second signal lines. The opposite substrate is combined with the array substrate, interposing a liquid crystal layer there between. The opposite substrate includes an opposite base substrate and first and second protruded electrodes. The first and second protruded electrodes are formed in regions corresponding to the first and second signal lines, respectively, and are electrically connected to the first and second signal lines, respectively, based on an externally provided pressure. Therefore, a thickness of the display panel is decreased, and a touch position is easily detected.

28 Claims, 15 Drawing Sheets

DISPLAY PANEL, DISPLAY DEVICE HAVING THE SAME AND METHOD OF DETECTING TOUCH POSITION

This application claims priority to Korean Patent Application No. 2005-89212, filed on Sep. 26, 2005 and all the benefits accruing therefrom under 35 U.S.C. §119, the contents of which in its entirety are herein incorporated by reference.

BACKGROUND OF THE INVENTION

1. Field of the Invention

The present invention relates to a display panel, a display device having the display panel, and a method of detecting touch position on the display device. More particularly, the present invention relates to a display panel capable of performing a touch screen function, a display device having the display panel, and a method of detecting the touch position on the display device.

2. Description of the Related Art

In general, a display device is a device that displays an image so that a user recognizes processed information that is processed by a processing unit. A flat panel display device has various characteristics such as a relatively small size, a relatively lightweight structure, and a relatively high resolution, etc., so that the flat panel display device has been widely used.

One type of flat panel display device is a liquid crystal display ("LCD") device that is most widely used in various fields. The LCD device displays the image using liquid crystals. Liquid crystals vary arrangement in response to an electric field applied thereto, and thus a light transmittance of the liquid crystals is changed.

The LCD device includes an LCD panel. The LCD panel includes an array substrate having a thin film transistor ("TFT") that is a switching element, an opposite substrate facing the array substrate, and a liquid crystal layer interposed between the array substrate and the opposite substrate.

The LCD device, in general, includes an input part having a control interface and a system part that calculates data to output a control signal. The data is applied to the system part through the input part. The LCD device displays the image through a one-way communication using the control signal.

The LCD device can further include a touch panel that receives data using icons displayed on a screen of the LCD device so that the user can directly input the data to the LCD panel.

The touch panel is on an uppermost portion of the LCD device to make contact with a finger or a touching object so that the user selects information displayed on the screen of the LCD device. The touch panel detects a touch position on which the finger or the touching object makes contact with the screen, and changes the touch position into an input signal to apply the input signal to the LCD device. When a computer includes the LCD device having the touch panel, an additional input part such as a keyboard, a mouse, etc., is unnecessary. In addition, in a mobile device such as a cellular phone including the LCD device having the touch panel, an additional input part such as a keypad is unnecessary. Thus, the touch panel has been widely used.

When the touch panel is formed on the LCD panel, a thickness and a size of the LCD device having the touch panel is increased. In order to decrease the thickness and the size of the LCD device, the touch panel is integrally formed with the LCD device. For example, the LCD device includes a photo sensor that detects a shadow formed by the finger or the touching object blocking the light when touching the touch panel or detects additional light generated from a light pen touching the touch panel.

However, when the LCD device includes the light sensor, an amount of the light sensed by the light sensor is dependent on an amount of an ambient light. That is, when the amount of the ambient light is increased, the amount of the light sensed by the light sensor is increased. Also, when the amount of the ambient light is decreased, the amount of the light sensed by the light sensor is decreased. Therefore, sensing capability of the light sensor is deteriorated so that the touch panel does not detect the touch position of the finger or the touching object.

BRIEF SUMMARY OF THE INVENTION

The present invention provides a display panel capable of performing touch screen function using an array substrate and an opposite substrate.

The present invention also provides a display device having the above-mentioned display panel.

The present invention also provides a method of detecting touch position on the display device.

A display panel in accordance with exemplary embodiments of the present invention includes an array substrate and an opposite substrate. The array substrate includes a plurality of pixels, a plurality of first signal lines, and a plurality of second signal lines. The pixels are formed in regions defined by a plurality of gate lines and a plurality of data lines crossing the gate lines. The first signal lines are extended substantially in parallel with the gate lines. The second signal lines are extended substantially in parallel with the data lines. The opposite substrate is combined with the array substrate, interposing a liquid crystal layer there between. The opposite substrate includes an opposite base substrate and first and second protruded electrodes. The first and second protruded electrodes are formed in regions corresponding to the first and second signal lines, respectively. The first and second protruded electrodes are electrically connected to the first and second signal lines, respectively, when applied with an externally provided pressure.

A display device in accordance with exemplary embodiments of the present invention includes a display panel, a panel driving part, a touch position detecting part, and a position determining part.

The display panel of the display device includes an array substrate and an opposite substrate. The array substrate includes a plurality of gate lines, a plurality of data lines, a plurality of first signal lines extended substantially in parallel with the gate lines, and a plurality of second signal lines extended substantially in parallel with the data lines. The opposite substrate is combined with the array substrate, interposing a liquid crystal layer there between. The opposite substrate includes an opposite base substrate, and a plurality of protruded electrodes electrically connected to the first and second signal lines when applied with an externally provided pressure. The panel driving part applies gate and data signals to the gate and data lines, respectively. The touch position detecting part detects first and second signal-lines electrically connected to protruded electrodes to output a detection signal. The position determining part determines position coordinates of the externally provided pressure based on the detection signal.

A method of detecting touch position on a display device in accordance with exemplary embodiments of the present invention is provided as follows. An initial driving voltage is applied to first and second signal lines formed on an array substrate. A portion of the first and second signal lines is electrically connected to a portion of protruded electrodes on an opposite substrate in response to an externally provided pressure, the protruded electrodes corresponding to the first and second signal lines, respectively, the portion of the first and second signal lines receiving a common voltage from the portion of protruded electrodes. The portion of the first and second signal lines electrically connected to the portion of the protruded electrodes is detected to output a first detection signal and a second detection signal. A voltage level of the portion of the first and second signal lines is changed by the electrical connection between the portion of the first and second signal lines and the portion of the protruded electrodes. Position coordinates corresponding to the externally provided pressure are determined based on the first and second detection signals.

According to the display panel, a display device having the display panel, and a method of detecting touch position on the display device having the display panel, the display panel includes the touch screen function not including a light sensor so that a thickness of the display panel is decreased. In addition, the touch position is not dependent on ambient light, but is instead determined based on a variation of a voltage or a current so that the touch position is precisely detected.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
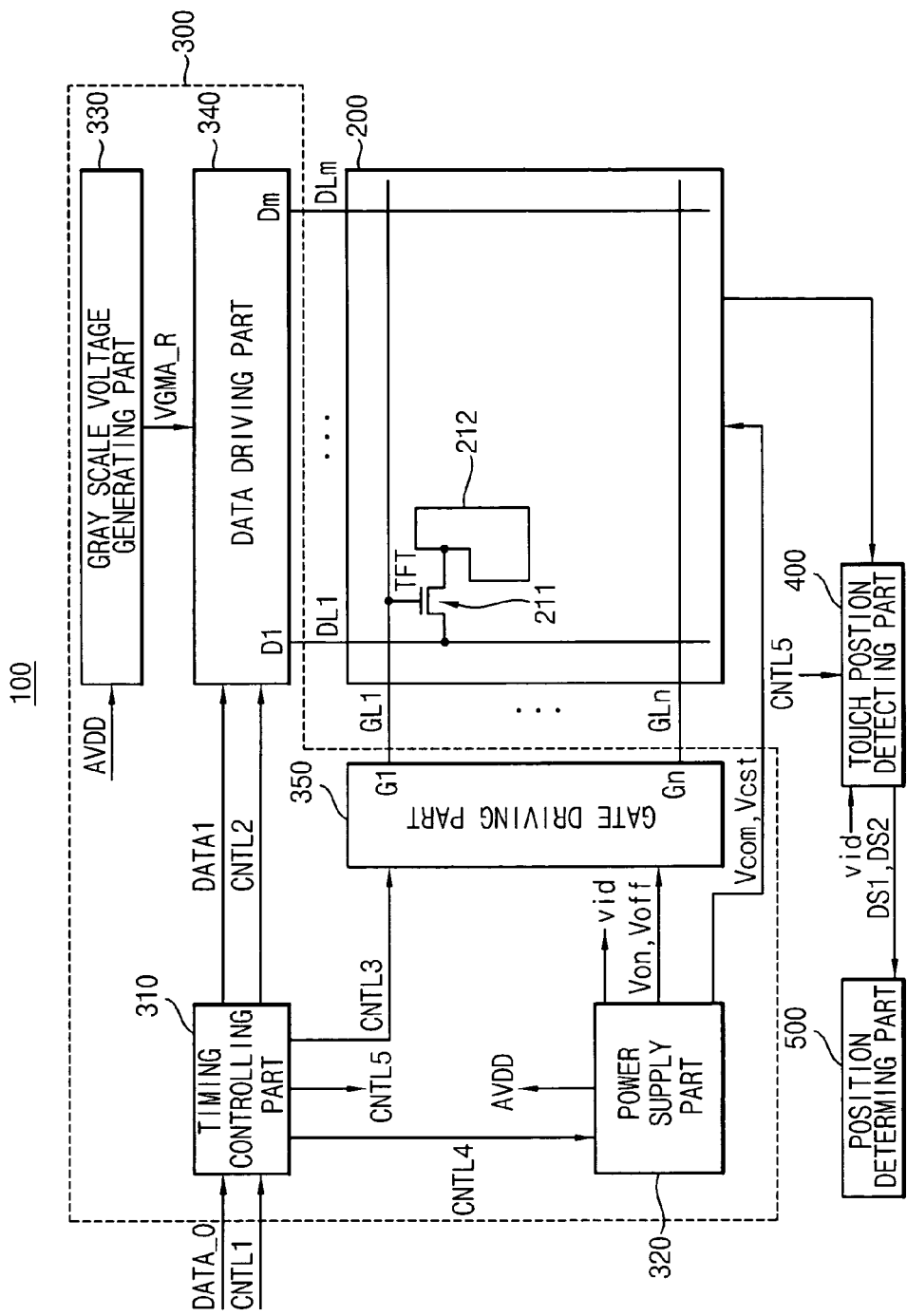
FIG. 1 is a block diagram illustrating an exemplary display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
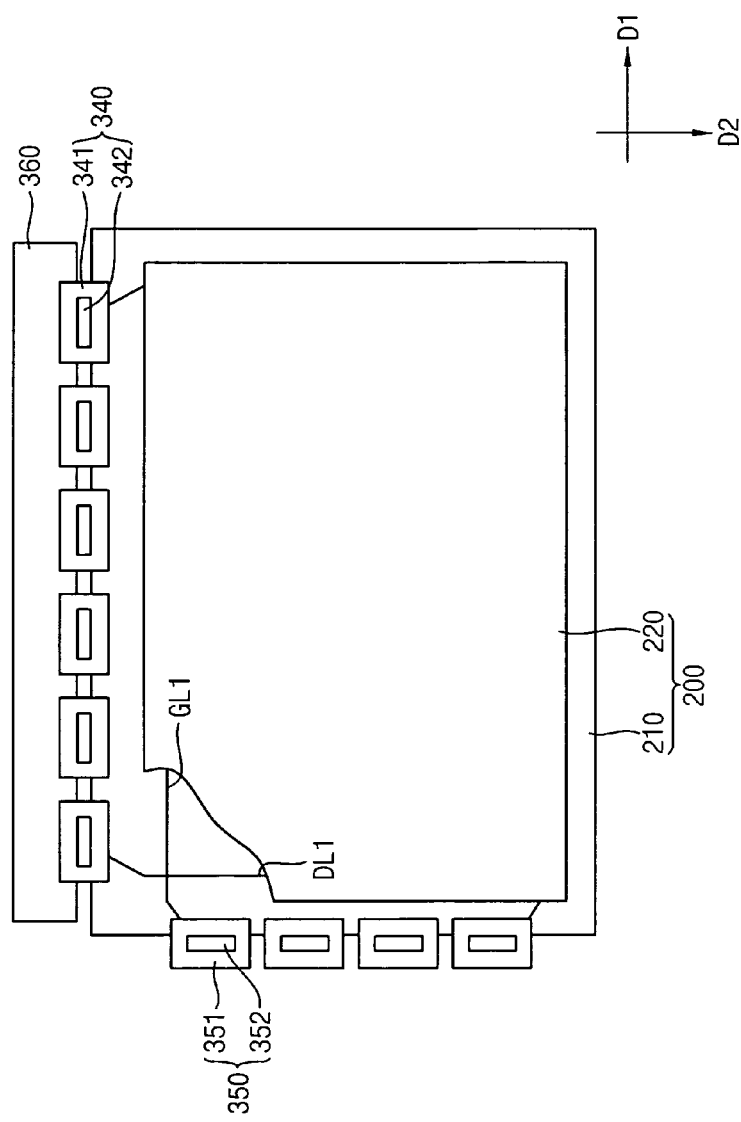
FIG. 2 is a plan view illustrating an exemplary display panel assembly according to an exemplary embodiment of the present invention.
Figure 3:
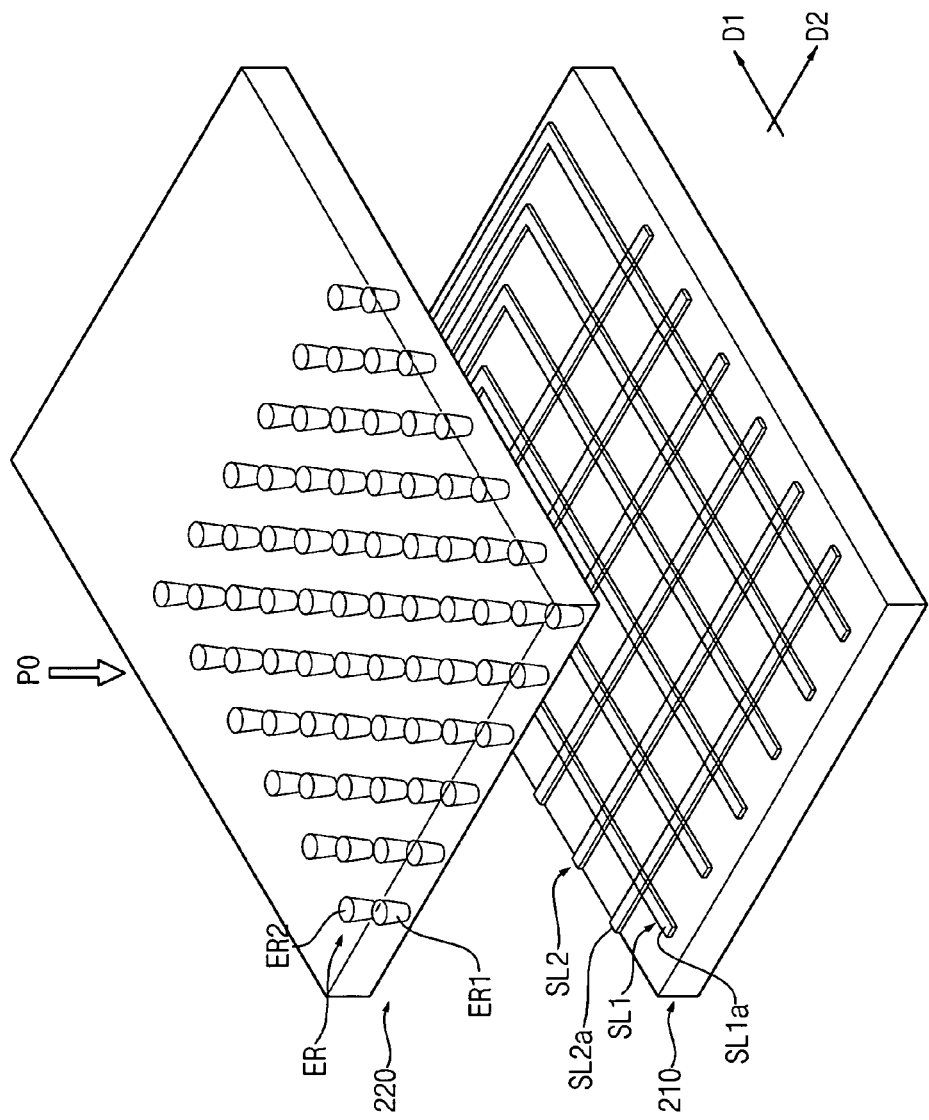
FIG. 3 is a perspective view illustrating an exemplary display panel according to an exemplary embodiment of the present invention.

FIG. 1 is a block diagram illustrating an exemplary display device according to an exemplary embodiment of the present invention. FIG. 2 is a plan view illustrating an exemplary display panel assembly according to an exemplary embodiment of the present invention. FIG. 3 is a perspective view illustrating an exemplary display panel according to an exemplary embodiment of the present invention.

Referring to FIGS. 1 and 2, the display device 100 includes a display panel 200, a panel driving part 300, a touch position detecting part 400, and a position determining part 500.

The display panel 200 includes an array substrate 210, an opposite substrate 220, and a liquid crystal layer (not shown). The array substrate 210 includes a plurality of switching elements, such as thin film transistors ("TFTs"). The opposite substrate 220 faces the array substrate 210. The liquid crystal layer is interposed between the array substrate 210 and the opposite substrate 220.

The array substrate 210 may further include a plurality of data lines DL1, DL2, . . . DLm, also known as source lines, arranged in a row direction, a first direction, of the array substrate 210 and a plurality of gate lines GL1, GL2, . . . GLn, also known as scan lines, arranged in a column direction, a second direction substantially perpendicular to the first direction, of the array substrate 210.

The number of gate lines GL1, GL2, . . . GLn of the array substrate 210 is n, and the gate lines GL1, GL2, . . . GLn are extended in a first direction D1. The number of data lines DL1, DL2, . . . DLm of the array substrate 210 is m, and the data lines DL1, DL2, . . . DLm are extended in a second direction D2 that is substantially perpendicular to the first direction D1. A plurality of pixels is formed in a matrix configuration in regions defined by the gate and data lines GL1, GL2, . . . GLn and DL1, DL2, . . . DLm. Here, 'n' and 'm' are natural numbers.

For example, a TFT 211 of the TFTs and a pixel electrode 212 are formed where the first data line DL1 crosses the first gate line GL1. A gate electrode of the TFT 211 is electrically connected to the first gate line GL1. A source electrode of the TFT 211 is electrically connected to the first data line DL1. A drain electrode of the TFT 211, formed within a same layer as the source electrode but separated from the source electrode, is electrically connected to the pixel electrode 212. Also, the m×n TFTs are formed in which the data lines DL1, DL2, . . . DLm cross the gate lines GL1, GL2, . . . GLn.

Referring to FIGS. 1 to 3, the array substrate 210 may further include a plurality of first signal lines SL1 and a plurality of second signal lines SL2 to perform a touch screen function. The first signal lines SL1 are extended in the first direction D1, and the second signal lines SL2 are extended in the second direction D2. The first signal lines SL1 cross the second signal lines SL2, and are electrically insulated from the second signal lines SL2, as they are formed in different layers of the array substrate 210, as will be further described below.

An initial driving voltage Vid having a predetermined level is applied from the power supply part 320 to the first and second signal lines SL1 and SL2 that are formed on the array substrate 210. The first and second signal lines SL1 and SL2 are electrically connected to the touch position detecting part 400 (shown in FIG. 1).

The first and second signal lines SL1 and SL2 may be formed in unit pixel parts, respectively. Each of the unit pixel parts includes a red (R) pixel, a green (G) pixel, and a blue (B) pixel, although alternately colored pixels forming a unit pixel part would also be within the scope of these embodiments. Alternatively, the first and second signal lines SL1 and SL2 may correspond to a plurality of unit pixel parts. For example, the first and second signal lines SL1 and SL2 may be formed in every four unit pixel parts, respectively.

The opposite substrate 220 faces the array substrate 210, and is combined with the array substrate 210 with the liquid crystal layer interposed there between. The opposite substrate 220 may be a color filter substrate having a plurality of color filters. Alternatively, the color filters may be formed on the array substrate 210.

In addition, the opposite substrate 220 may further include a plurality of protruded electrodes ER for performing the touch screen function. When an externally provided pressure PO is applied to at least one of the protruded electrodes ER, the protruded electrode ER is electrically connected to one of the first signal lines SL1 and/or one of the second signal lines SL2 that are formed on the array substrate 210.

For example, the protruded electrodes include a plurality of first protruded electrodes ER1 and a plurality of second protruded electrodes ER2. The first protruded electrodes ER1 are electrically connected to a first signal line SL1a of the first signal lines SL1 at a plurality of points. The second protruded electrodes ER2 are electrically connected to a second signal line SL2a of the second signal lines SL2. The first and second protruded electrodes ER1 and ER2 are formed on the opposite substrate 220 corresponding to the first and second signal lines SL1a and SL2a.

The first and second protruded electrodes ER1 and ER2 may be formed in the unit pixel parts, respectively, where, for example, each of the unit pixel parts includes a red (R) pixel, a green (G) pixel, and a blue (B) pixel. Alternatively, the first and second protruded electrodes ER1 and ER2 may correspond to a plurality of the unit pixel parts. By example only, the first and second protruded electrodes ER1 and ER2 may be formed in every four unit pixel parts, respectively.

The array substrate 210 includes the first signal lines SL1 and the opposite substrate 220 includes the first protruded electrodes ER1 to detect y-coordinates of the touch position.

In particular, when the externally provided pressure PO is applied to one of the first protruded electrodes ER1, the first protruded electrode ER1 is electrically connected to one of the first signal lines SL1 so that a level of the initial driving voltage Vid applied to the first signal line SL1 is changed, thereby detecting the y-coordinates of the externally provided pressure PO on the display panel 200.

The array substrate 210 includes the second signal lines SL2 and the opposite substrate 220 includes the second protruded electrodes ER2 to detect x-coordinates of the touch position. In particular, when the externally provided pressure PO is applied to one of the second protruded electrodes ER2, the second protruded electrode ER2 is electrically connected to one of the second signal lines SL2 so that a level of the initial driving voltage Vid applied to the second signal line SL2 is changed, thereby detecting the x-coordinates of the externally provided pressure PO on the display panel 200.

With reference again to FIG. 1, the panel driving part 300 includes a timing controlling part 310, a power supply part 320, a gray-scale voltage generating part 330, a data driving part 340, and a gate driving part 350.

The timing controlling part 310 controls an operation of the display device 100. The timing controlling part 310 generates a first data signal DATA1, a second control signal CNTL2, a third control signal CNTL3, and a fourth control signal CNTL4 based on red (R), green (G) and blue (B) primary data signals DATA_0, and a first control signal CNTL1 and a fifth control signal CNTL5. The red (R), green (G) and blue (B) primary data signals DATA_0 and the first control signal CNTL1 are provided from an exterior to the timing controlling part 310 of the display panel 200.

Particularly, the first control signal CNTL1 includes a main clock signal MCLK, a horizontal synchronizing signal HSYNC, and a vertical synchronizing signal VSYNC. The second control signal CNTL2 includes a horizontal start signal STH, an inversion signal REV, and a data load signal TP for controlling the data driving part 340. The third control signal CNTL3 includes a start signal STV, a clock signal CK, and an output enable signal OE, etc., for driving the gate driving part 350. The fourth control signal CNTL4 includes another clock signal CLK and an inversion signal REV.

The timing controlling part 310 controls timing of the primary data signal DATA_0 to apply a timing controlled R', G' and B' first data signal DATA1 to the data driving part 340.

The timing controlling part 310 may further output a fifth control signal CNTL5 for controlling the touch position detecting part 400. The fifth control signal CNTL5 includes another clock signal for controlling the initial driving voltage Vid that is outputted from the power supplying part 320 so that the initial driving voltage Vid is applied to the first and second signal lines SL1 and SL2.

The power supplying part 320 generates common voltages Vcom and Vcst applied to the display panel 200, the initial driving voltage Vid applied to the array substrate 210 for performing the touch screen function, an analog driving voltage AVDD applied to the gray-scale voltage generating part 330, and gate on/off voltages Von and Voff applied to the gate driving part 350 based on the fourth control signal CNTL4 outputted from the timing controlling part 310.

The gray-scale voltage generating part 330 generates a plurality of reference gray-scale voltages VGMA_R corresponding to the number of gray-scales based on a division resistor having a resistance ratio corresponding to a gamma curve using the analog driving voltage AVDD from the power supply part 320 as a reference voltage.

The data driving part 340 includes a data tape carrier package ("TCP") 341. The array substrate 210 is electrically connected to a data printed circuit board ("PCB") 360 on which the timing controlling part 310 is formed through the data TCP 341.

For example, the data lines DL1, DL2, . . . DLm may be grouped into a plurality of groups, and a plurality of data TCPs 341 may be electrically connected to the groups, respectively. Each of the data TCPs 341 generates a gray-scale voltage VGMA based on the reference gray-scale voltage VGMA_R outputted from the gray-scale voltage generating part 330.

In addition, the data TCP 341 changes the first data signal DATA1 of a digital type into a plurality of data signals D1, D2, . . . Dm of an analog type based on the second control signal CNTL2 from the timing controlling part 310 and based on the gray-scale voltage VGMA. The data TCP 341 controls an output timing of an application of the data signals D1, D2, . . . Dm to the data lines DL1, DL2, . . . DLm, respectively.

The gate driving part 350 includes a gate TCP 351. Alternatively, the gate driving part 350 may further include a plurality of gate TCPs 351 to divide the gate lines GL1, GL2, . . . GLn into a plurality of groups. The gate TCPs 351 applies a plurality of gate signals G1, G2, . . . Gn based on the third control signal CNTL3 outputted from the timing controlling part 310 and the gate on/off voltages Von and Voff outputted from the power supply part 320 to the gate lines GL1, GL2, . . . GLn, respectively.

The touch position detecting part 400 detects a location of the externally provided pressure PO that is applied to the opposite substrate 220.

That is, when the externally provided pressure PO is applied to one of the protruded electrodes ER of the opposite substrate 220, one of the first protruded electrodes ER1 may be electrically connected to one of the first signal lines SL1 extended in the first direction D1 of the array substrate 210 to change the level of the initial driving voltage Vid applied to the first signal line SL1, thereby detecting the y-coordinates of the externally provided pressure PO.

In addition, when the externally provided pressure PO is applied to one of the protruded electrodes ER of the opposite substrate 220, one of the second protruded electrodes ER2 may also be electrically connected to one of the second signal lines SL2 extended in the second direction D2 of the array substrate 210 to change the level of the initial driving voltage Vid applied to the second signal line SL2, thereby detecting the x-coordinates of the externally provided pressure PO.

The touch position detecting part 400 may further include a voltage controlling part and a data sampling part, as will be further described below. The voltage controlling part applies the initial driving voltage Vid to the first and second signal lines SL1 and SL2 based on the fifth control signal CNTL5. The data sampling part detects the variation of the initial driving voltage Vid on the first and second signal lines SL1 and SL2 to output first and second detection signals DS1 and DS2.

The touch position detecting part 400 may be formed on the data driving part 340 of the panel driving part 300. That is, the touch position detecting part 400 may be integrally formed with a data driving chip 342 on the data TCP 341 of the data driving part 340. When the touch position detecting part 400 is integrally formed with the data driving chip 342, the data driving chip 342 may further include additional pads electrically connected to the first and second signal lines SL1 and SL2, where the first signal lines SL1 may be bent at right angles at one end thereof as shown in FIG. 3 to connect to the data driving part 340.

The position determining part 500 processes the y-coordinates and the x-coordinates based on the first and second detection signals DS1 and DS2 outputted from the touch position detecting part 400 to determine the position of the externally provided pressure PO on the display panel 200.

Figure 4:
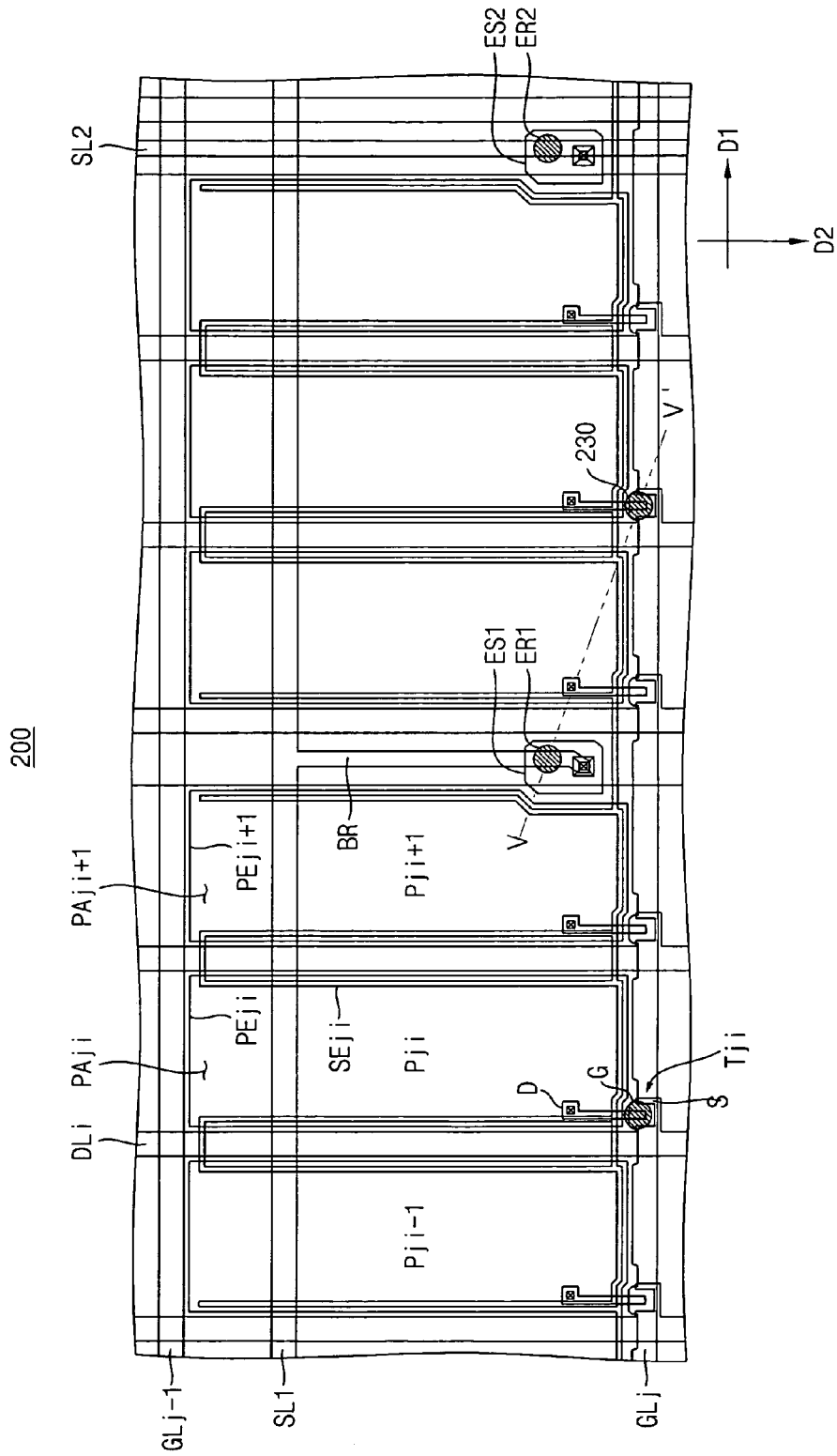
FIG. 4 is a plan view illustrating a portion of an exemplary display panel according to an exemplary embodiment of the present invention.

FIG. 4 is a plan view illustrating a portion of an exemplary display panel according to an exemplary embodiment of the present invention.

Referring to FIGS. 3 and 4, the display panel 200 includes an array substrate 210, an opposite substrate 220, and a liquid crystal layer (not shown) interposed between the array substrate 210 and the opposite substrate 220.

The array substrate 210 includes a plurality of pixels arranged in a matrix shape. Each of the pixels is a unit for displaying an image. For example, a ji-th pixel Pji includes a j-th gate line GLj, an i-th data line DLi, a ji-th TFT Tji and a ji-th pixel electrode PEji.

The j-th gate line GLj is extended in a first direction D1 of the array substrate 210. The i-th data line DLi is extended in a second direction D2 of the array substrate 210. The second direction D2 is substantially perpendicular to the first direction D1. The j-th gate line GLj is electrically insulated from the i-th data line Dli, such as by a gate insulating layer, as will be further described below.

The i-th data line DLi, the j-th gate line GLj, an (i+1)-th data line DLi+1 adjacent to the i-th data line DLi, and a (j−1)-th gate line GLj−1 adjacent to the j-th gate line GLj define a ji-th pixel region PAji. The ji-th TFT Tji and the ji-th pixel electrode PEji are formed in the ji-th pixel region PAji.

A gate electrode G of the ji-th TFT Tji is electrically connected to the j-th gate line GLj. A source electrode S of the ji-th TFT Tji is electrically connected to the i-th data line DLi. A drain electrode D of the ji-th TFT Tji is electrically connected to the ji-th pixel electrode PEji. The ji-th TFT Tji applies an i-th data signal from the i-th data line DLi to the ji-th pixel electrode PEji based on a j-th gate signal from the j-th gate line GLj.

The ji-th pixel Pji may further include a ji-th storage voltage line SEji that receives a common voltage Vcom and defines an auxiliary capacitance Cst.

The array substrate 210 may further include a plurality of first signal lines SL1 and a plurality of second signal lines SL2. The first signal lines SL1 are extended in the first direction D1, and are substantially parallel with the gate lines GLj−1 and GLj. The second signal lines SL2 are extended in the second direction D2, and are substantially parallel with the data lines DLi and DLi+1.

The first signal lines SL1 may be formed from a substantially same layer of the array substrate 210 as the gate lines GLj−1 and GLj, and the second signal lines SL2 may be formed from a substantially same layer of the array substrate 210 as the data lines DLi and DLi+1. An initial driving voltage Vid is applied to the first and second signal lines SL1 and SL2.

In addition, the array substrate 210 may further include a plurality of first sensing electrodes ES1 formed on the first signal lines SL1. The first sensing electrodes ES1 correspond to a plurality of first protruded electrodes ER1 of the opposite substrate 220. A first sensing electrode ES1 is electrically connected to a corresponding first protruded electrode ER1 when an externally provided pressure PO (shown in FIG. 6) is applied to the first protruded electrode ER1. Furthermore, the array substrate 210 may further include a plurality of second sensing electrodes ES2 formed on the second signal lines SL2. The second sensing electrodes ES2 correspond to a plurality of second protruded electrodes ER2 of the opposite substrate 220. A second sensing electrode ES2 is electrically connected to a corresponding second protruded electrode ER2 when an externally provided pressure PO is applied to the second protruded electrode ER2.

Figure 5:
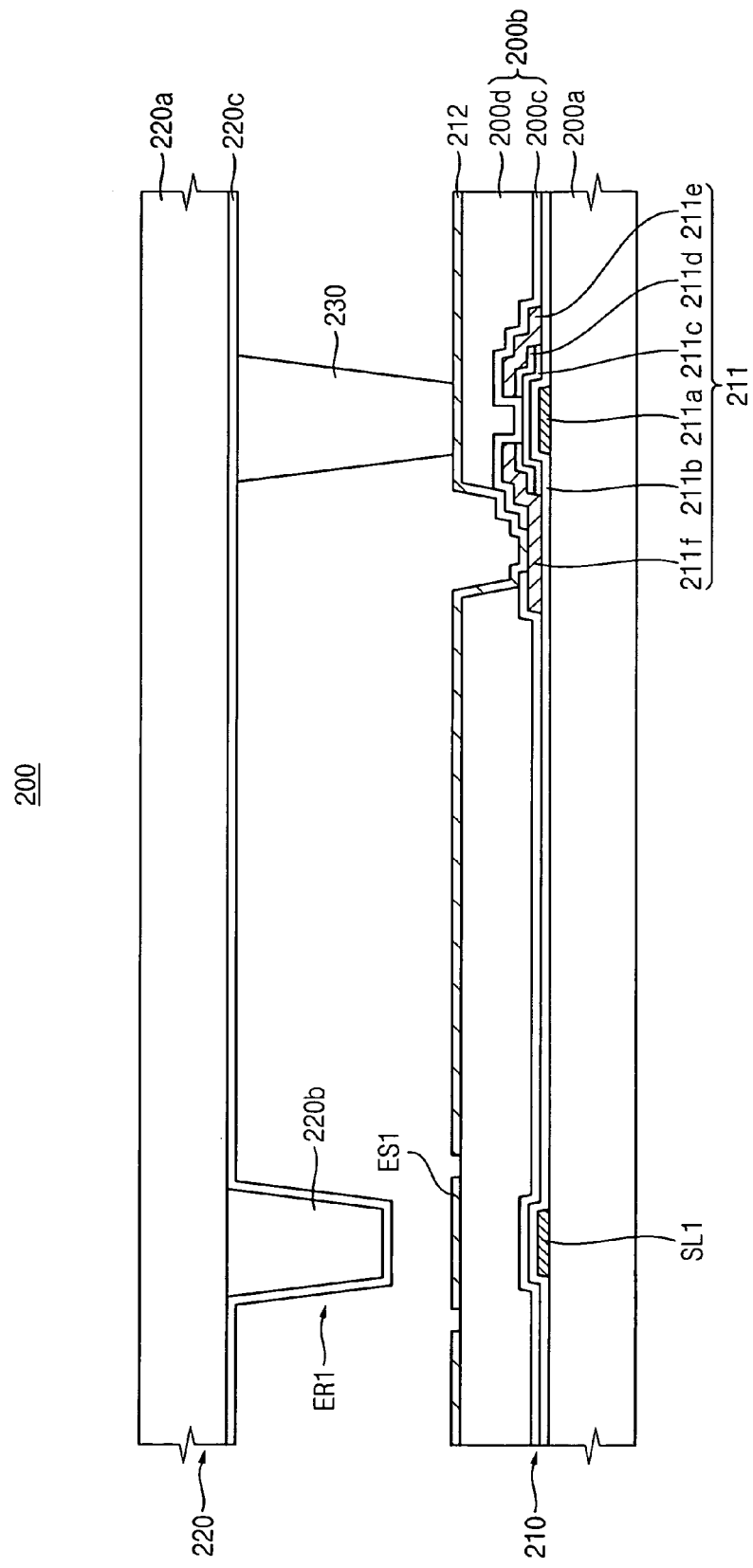
FIG. 5 is a cross-sectional view taken along line V-V' in FIG. 4.
Figure 6:
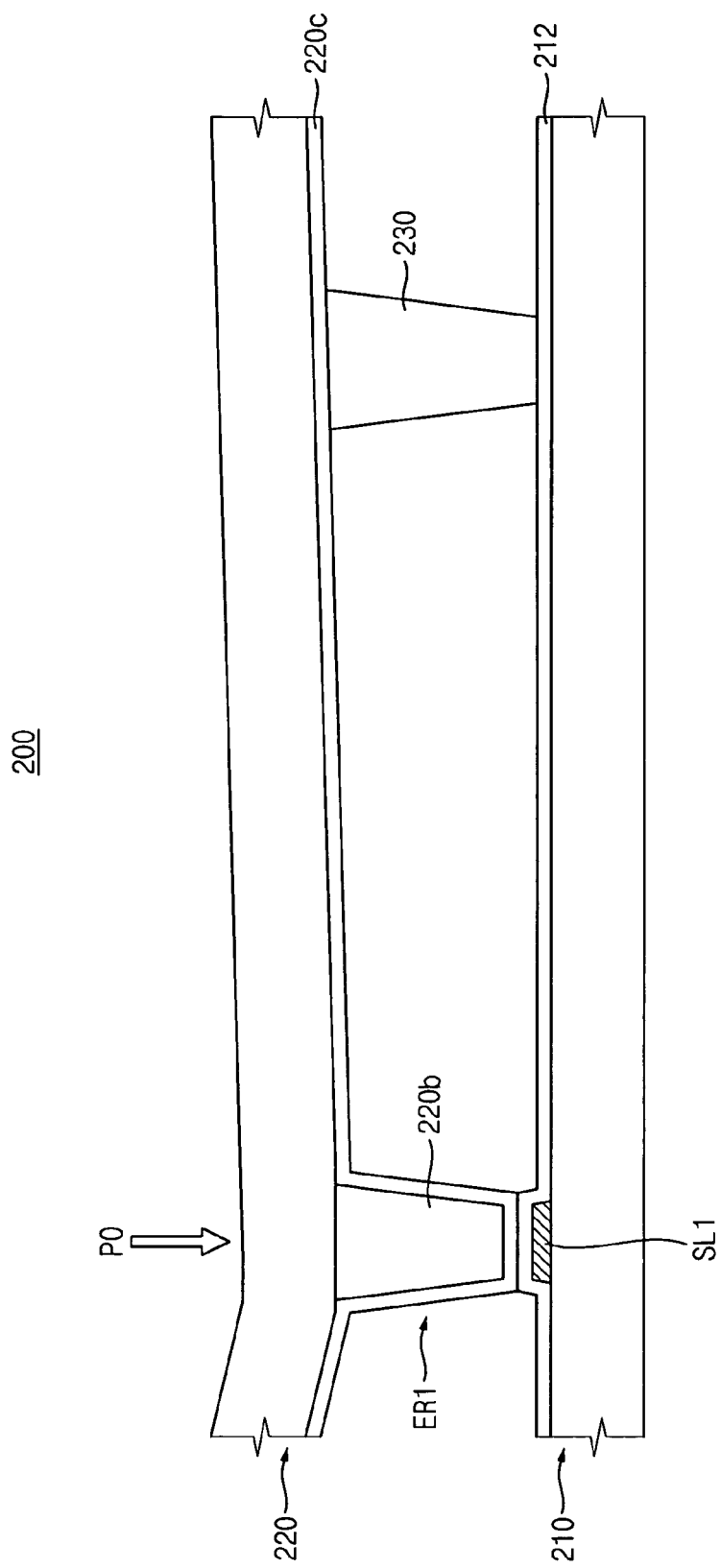
FIG. 6 is a cross-sectional view illustrating the exemplary display panel of FIG. 4 when an external pressure is applied to an exemplary opposite substrate.

FIG. 5 is a cross-sectional view taken along line V-V' in FIG. 4. FIG. 6 is a cross-sectional view illustrating the exemplary display panel of FIG. 4 when an external pressure is applied to an exemplary opposite substrate.

Referring to FIG. 5, the array substrate 210 includes a base substrate 200a, a TFT array layer 200b, and a pixel electrode layer 212.

The base substrate 200a includes a transparent insulating material, such as, but not limited to, glass, quartz, etc.

The TFT array layer 200b is on the base substrate 200a. The TFT array layer 200b includes a plurality of TFTs 211, a passivation layer 200c, and a planarizing layer 200d.

Each TFT 211 includes a gate electrode 211a, a gate insulating layer 211b, an active layer 211c, an ohmic contact layer 211d, a source electrode 211e, and a drain electrode 211f.

The passivation layer 200c may include, for example, an inorganic insulating layer covering the TFTs 211.

The planarizing layer 200d is formed on the passivation layer 200c, and may include, for example, an organic insulating layer that planarizes the array substrate 210.

A contact hole, through which the drain electrode 211f of each TFT 211 is partially exposed, is formed through the passivation layer 200c and the planarizing layer 200d.

The first signal lines SL1 may be formed on the base substrate 200a and are formed from a substantially same layer as the gate electrode 211a as well as the gate lines GL and any storage electrode lines SE. The gate insulating layer 211b, the passivation layer 200c, and the planarizing layer 200d cover the first signal lines SL1. Thus, the first signal lines SL1 are electrically insulated from the first protruded electrodes ER1.

The second signal lines SL2 may be formed on the gate insulating layer 211b from a substantially same layer as the source electrodes 211e and the drain electrodes 211f as well as the data lines DL. The passivation layer 200c and the planarizing layer 200d cover the second signal lines SL2. Thus, the second signal lines SL2 are electrically insulated from the second protruded electrodes ER2.

The first sensing electrodes ES1 are formed on the planarizing layer 200d so that the first sensing electrodes ES1 may be electrically connected to the first protruded electrodes ER1. The first sensing electrodes ES1 are formed from a same layer of the array substrate 210 as the pixel electrode layer 212. The first sensing electrodes ES1 are electrically connected to the first signal lines SL1 through a contact hole through which the first signal lines SL1 are partially exposed. The contact hole for partially exposing the first signal lines SL1 is formed through the gate insulating layer 211b, the passivation layer 200c and the planarizing layer 200d.

The second sensing electrodes ES2 may also be formed on the planarizing layer 200d so that the second sensing electrodes ES2 may be electrically connected to the second protruded electrodes ER2. The second sensing electrodes ES2 may be formed from a same layer of the array substrate 210 as the pixel electrode layer 212. The second sensing electrodes ES2 are electrically connected to the second signal lines SL2 through a contact hole through which the second signal lines SL2 are partially exposed. The contact hole for partially exposing the second signal lines SL2 may be formed through the passivation layer 200c and the planarizing layer 200d.

The opposite substrate 220 includes an opposite base substrate 220a, a protrusion 220b, and a common electrode layer 220c. Alternatively, the opposite substrate 220 may further include a plurality of protrusions 220b.

The opposite base substrate 220a includes a transparent insulating material, such as, but not limited to, glass, quartz, a synthetic resin, etc. In one embodiment, the opposite base substrate 220a includes polycarbonate ("PC") to be easily bent in response to an externally provided pressure PO. Alternatively, a glass substrate may be etched or grinded to form the opposite base substrate 220a having a thickness of about 0.2 mm to about 0.5 mm.

The protrusions 220b may include insulating material such as silicon oxide, and are protruded from the opposite base substrate 220a.

Particularly, a portion of the protrusions 220b correspond to the first signal lines SL1 that are formed on the array substrate 210. In FIG. 5, a plurality of protrusions 220b corresponds to each of the first signal lines SL1. In addition, another portion of the protrusions 220b correspond to the second signal lines SL2 that are formed on the array substrate 210. Alternatively, the protrusions 220b may also correspond to the first and second signal lines SL1 and SL2.

The protrusions 220b are protruded from the opposite base substrate 220a toward the array substrate 210 by a predetermined height. A height of each of the protrusions 220b is smaller than a cell-gap, where the cell-gap is a distance between the array substrate 210 and the opposite substrate 220.

The common electrode layer 220c is formed on the opposite base substrate 220a. In FIG. 5, the common electrode layer 220c may be formed on a substantially entire surface of the opposite base substrate 220a. The common electrode layer 220c includes a transparent conductive material, such as, but not limited to, indium tin oxide ("ITO"), indium zinc oxide ("IZO"), etc.

Referring to FIG. 6, the common electrode layer 220c covers the protrusions 220b. When the externally provided pressure PO is applied to the opposite base substrate 220a corresponding to one of the protrusions 220b, the opposite base substrate 220a corresponding to the protrusion 220b is bent toward the array substrate 210 so that a portion of the common electrode layer 220c on the protrusion 220b makes electrical contact with one of the first sensing electrodes ES1.

Since the first sensing electrode ES1 is electrically connected to one of the first signal lines SL1, when the externally provided pressure PO is applied, the common electrode layer 220c is in turn electrically connected to the first signal line SL1.

The protrusion 220b and the portion of the common electrode layer 220c on the protrusion 220b form the first protruded electrode ER1 that is protruded from the opposite base substrate 220a toward the array substrate 210.

When the first protruded electrode ER1 is electrically connected to the first signal line SL1, a level of the initial driving voltage Vid applied to the first signal line SL1 is changed.

The first protruded electrodes ER1 are formed in a region corresponding to a black matrix of the opposite substrate 220, where the black matrix surrounds color filters of the opposite substrate 220. In FIGS. 5 and 6, the first protruded electrodes ER1 and the first sensing electrodes ES1 are not overlapped with transmission regions of the pixels so that opening rate of the pixels is not decreased. In other words, the aperture ratio of the pixels is not decreased because of the locations of the first protruded electrodes ER1 and the first sensing electrodes ES1.

In order to maintain the opening rate of the pixels, each of the first signal lines SL1 that are extended in the first direction D1 includes a branch line BR that is branched from the first signal line SL1 in the second direction D2, as shown in FIG. 4. Alternatively, each of the first signal lines SL1 may include a plurality of branch lines BR. The first sensing electrodes ES1 may be formed on the branch line BR corresponding to the first protruded electrodes ER1 formed in the region of the opposite substrate 220 corresponding to the black matrix.

Alternatively, each of the first protruded electrodes ER1 may be formed between a unit pixel part having a (ji−1)-th pixel, a ji-th pixel and a (ji+1)-th pixel and an adjacent unit pixel part, and the black matrix covers the first protruded electrode ER1. Each of the unit pixel parts may include a red (R) pixel, a green (G) pixel, and a blue (B) pixel that display red, green, and blue colors, respectively.

For example, the first sensing electrode ES1 corresponding to the (ji+1)-th pixel may be formed from a substantially same layer as pixel electrodes PE of the pixels. In other words, both the pixel electrodes PE and the first sensing electrodes ES1, as well as the second sensing electrodes ES2, may be formed from the pixel electrode layer 212. The first sensing electrode ES1 corresponding to the (ji+1)-th pixel electrode PEji+1 is spaced apart from the (ji+1)-th pixel electrode PEji+1 by a predetermined distance to decrease an electrical coupling between the first sensing electrode ES1 and the (ji+1)-th pixel electrode PEji+1. In order to decrease the electrical coupling, the (ji+1)-th pixel electrode PEji+1 adjacent to the first sensing electrode ES1 may be recessed toward a center of a (ji+1)-th pixel region Paji+1 of the (ji+1)-th pixel electrode PEji+1.

The display panel 200 may further include a spacer. The spacer is interposed between the array substrate 210 and the opposite substrate 220 so that the array substrate 210 is spaced apart from the opposite substrate 220 by a predetermined distance, and maintains the distance, such as for defining the cell gap. For example, the spacer may be a column spacer 230, as shown in FIGS. 5 and 6.

In order to form the column spacer 230, a photoresist film including an organic material is coated on the opposite substrate 220. The photoresist film is exposed and patterned through a photo process using a photo mask. In FIGS. 5 and 6, the column spacer 230 is in the region corresponding to the black matrix so that the opening ratio of the pixels of the display panel 200 is not decreased. The display panel 200 may include a plurality of column spacers 230, depending on a size of the display panel 200.

When the externally provided pressure PO is applied to a portion of the opposite substrate 220, as shown in FIG. 6, the column spacer 230 supports a remaining portion of the opposite substrate 220 so that the first and second protruded electrodes ER1 and ER2 (shown in FIG. 3) corresponding to the externally provided pressure PO are electrically connected to the first and second signal lines SL1 and SL2 corresponding to the externally provided pressure PO, respectively. When the externally provided pressure PO is removed, the portion of the opposite substrate 220 recovers a substantially initial position by an elasticity of the opposite base substrate 220a so that the first and second protruded electrodes ER1 and ER2 are again spaced apart from the first and second signal lines SL1 and SL2, respectively, as shown in FIG. 5.

While FIGS. 5 and 6 have been illustrated and described with respect to the first signal lines SL1, the second signal lines SL2 are substantially the same as described in FIGS. 3 and 4, and are, as described above, formed in the second direction D2 and within a same layer as the data lines DL, the source electrodes S, and the drain electrodes D. It should be understood that the externally provided pressure PO applied to the second protruded electrode ER2 would connect the second protruded electrode ER2 to the second sensing electrode ES2, which is connected to the second signal line SL2, in a similar manner as the connection between the first protruded electrode ER1, the first sensing electrode ES1, and the first signal line SL1. Thus, any further explanations concerning the above elements will be omitted.

Figure 7:
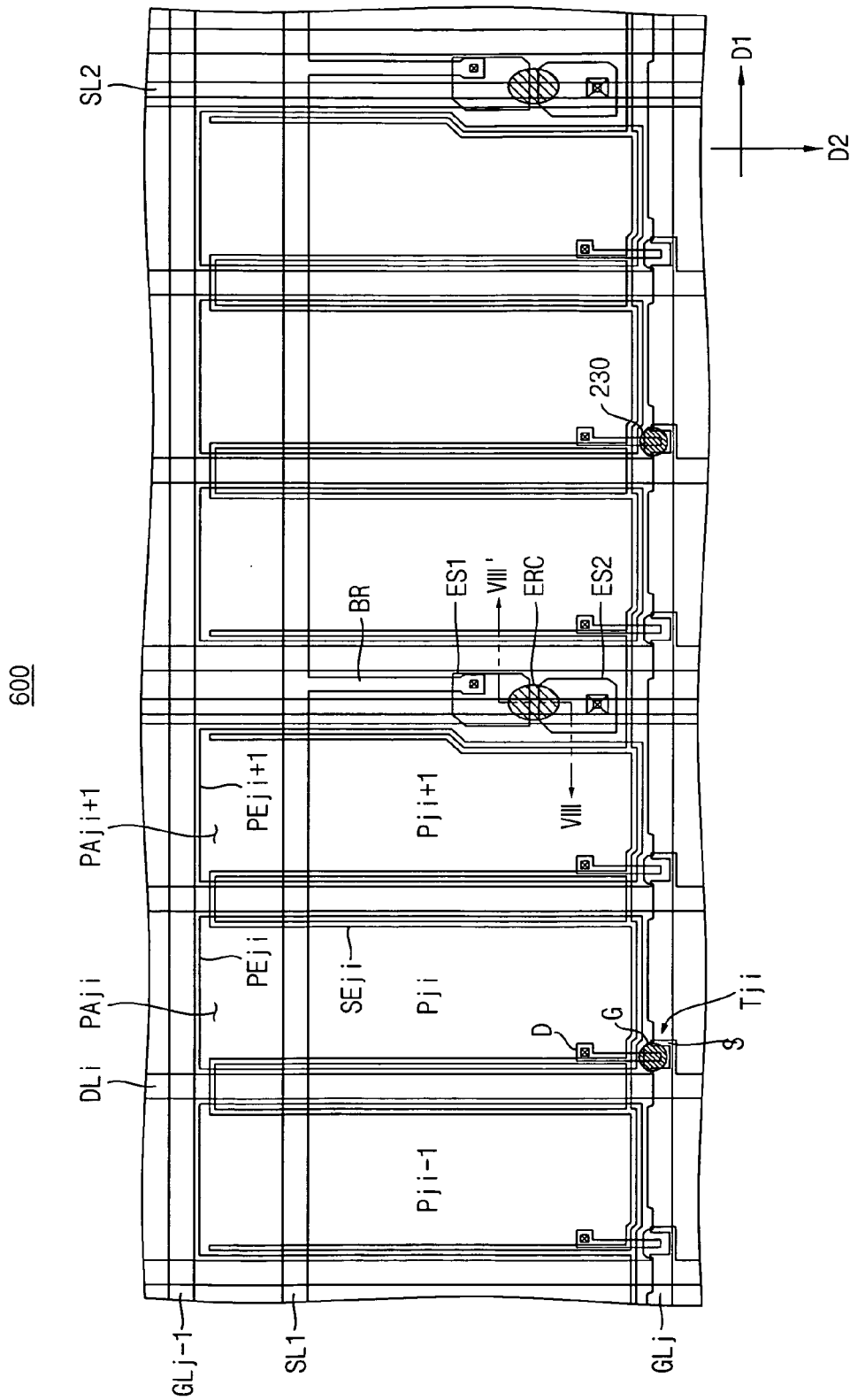
FIG. 7 is a plan view illustrating a portion of an exemplary display panel according to another exemplary embodiment of the present invention.
Figure 8:
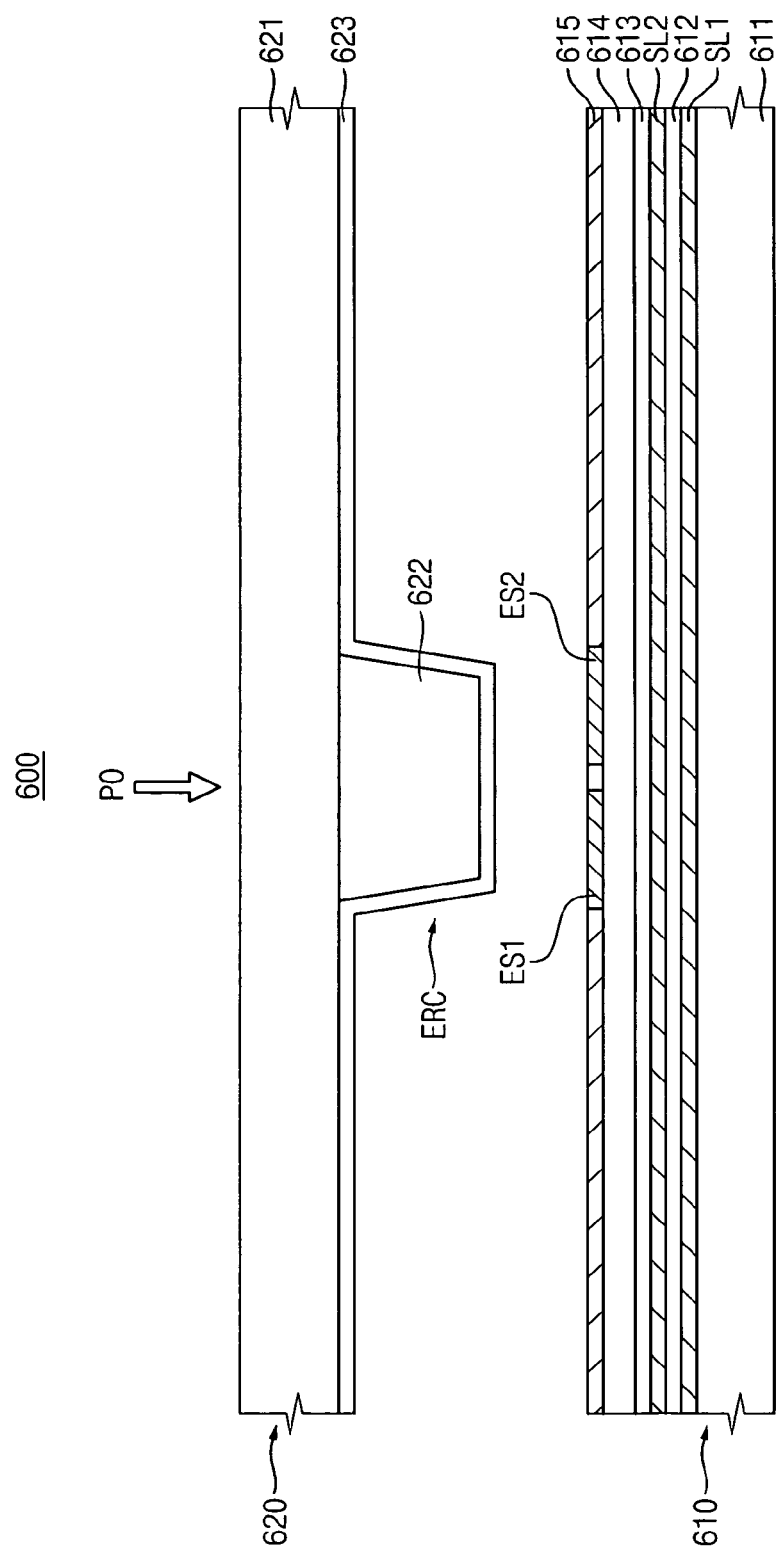
FIG. 8 is a cross-sectional view taken along line VIII-VIII' in FIG. 7.

FIG. 7 is a plan view illustrating a portion of an exemplary display panel according to another exemplary embodiment of the present invention. FIG. 8 is a cross-sectional view taken along line VIII-VIII' in FIG. 7.

Referring to FIGS. 7 and 8, the display panel 600 includes an array substrate 610, an opposite substrate 620, and a liquid crystal layer (not shown) interposed between the array substrate 610 and the opposite substrate 620.

The array substrate and the opposite substrate of FIGS. 7 and 8 are substantially the same as in FIGS. 4 to 6 except first signal lines, second signal lines, sensing electrodes and protruded electrodes. Thus, further explanations concerning certain similar features of the array substrate and the opposite substrate as in FIGS. 4 and 6 may not be included in the description of FIGS. 7 and 8.

The array substrate 610 may further include a plurality of first signal lines SL1 and a plurality of second signal lines SL2. The first signal lines SL1 are extended in the first direction Dl, and are substantially parallel to the gate lines GLj−1 and GLj. The second signal lines SL2 are extended in the second direction D2, and are substantially parallel to the data lines DLi and DLi+1.

The first signal lines SL1 may be formed from a substantially same layer of the array substrate 610 as the gate lines GLj−1 and GLj, and the second signal lines SL2 may be formed from a substantially same layer of the array substrate 610 as the data lines DLi and DLi+1. An initial driving voltage Vid is applied to the first and second signal lines SL1 and SL2.

In addition, the array substrate 610 may further include a plurality of first sensing electrodes ES1 formed on the first signal lines SL1. The first sensing electrodes ES1 may be on an uppermost layer of the array substrate 610, and formed within a same layer as the pixel electrodes PE. The first sensing electrodes ES1 correspond to a plurality of first protruded electrodes, hereinafter referred to as protruded electrodes ERC, of the opposite substrate 620. Each of the first sensing electrodes ES1 is electrically connected to each of the protruded electrodes ERC based on an externally provided pressure PO. Furthermore, the array substrate 610 may further include a plurality of second sensing electrodes ES2 formed on the second signal lines SL2. The second sensing electrodes ES2 may be on the uppermost layer of the array substrate 610, and formed within a same layer as the first sensing electrodes ES1 and the pixel electrodes PE. The second sensing electrodes ES2 correspond to a plurality of second protruded electrodes, hereinafter referred to as protruded electrodes ERC, of the opposite substrate 620. Each of the second sensing electrodes ES2 is electrically connected to each of the protruded electrodes ERC based on the externally provided pressure PO.

The array substrate 610 includes a base substrate 611, a TFT array layer (not shown), and a pixel electrode layer 615. The first sensing electrodes ES1 are electrically connected to the first signal lines SL1 through contact holes through which the first signal lines SL1 are partially exposed. The second sensing electrodes ES2 are electrically connected to the second signal lines SL2 through contact holes through which the second signal lines SL2 are partially exposed. The contact holes for partially exposing the first signal lines SL1 are formed through a gate insulating layer 612, a passivation layer 613, and a planarizing layer 614 of the TFT array layer, and the contact holes for partially exposing the second signal lines SL2 are formed through a passivation layer 613 and a planarizing layer 614 of the TFT array layer.

Each of the first sensing electrodes ES1 is adjacent to each of the second sensing electrodes ES2. The adjacent first and second sensing electrodes ES1 and ES2 correspond to a unit pixel part that includes, for example, a red (R) pixel, a green (G) pixel and a blue (B) pixel. The first and second sensing electrodes ES1 and ES2 are in a region corresponding to a black matrix of the opposite substrate 620.

The opposite substrate 620 includes an opposite base substrate 621, a protrusion 622, and a common electrode layer 623. Alternatively, the opposite substrate 620 may further include a plurality of protrusions 622.

A plurality of common protruded electrodes ERC is formed on the opposite base substrate 621. Each of the protrusions 622 and a portion of a common electrode layer 623 on the protrusion 622 form each of the common protruded electrodes ERC.

Particularly, each of the common protruded electrodes ERC includes each of the protrusions 622 that are formed on the opposite base substrate 621 and the portion of the common electrode layer 623 covering the protrusion 622, and corresponding to the adjacent first and second sensing electrodes ES1 and ES2.

The common electrode layer 623 covers the protrusions 622. When the externally provided pressure PO is applied to the opposite base substrate 621 corresponding to one of the protrusions 622, the opposite base substrate 621 corresponding to the protrusion 622 is bent toward the array substrate 610 so that the portion of the common electrode layer 623 on the protrusion 622 makes contact with the adjacent first and second sensing electrodes ES1 and ES2. That is, the common protruded electrode ERC is electrically connected to the adjacent first and second sensing electrodes ES1 and ES2 in response to the externally provided pressure PO.

The adjacent first and second sensing electrodes ES1 and ES2 are electrically connected to one of the first signal lines SL1 and one of the second signal lines SL2, respectively, so that the common electrode layer 623 is electrically connected to both of the first and second signal lines SL1 and SL2.

When the common protruded electrode ERC is electrically connected to the first and second signal lines SL1 and SL2, a level of the initial driving voltage Vid applied to the first and second signal lines SL1 and SL2 is changed.

The common protruded electrodes ERC are formed in the region of the opposite substrate 620 corresponding to the black matrix. The common protruded electrodes ERC, the first sensing electrodes ES1 and the second sensing electrodes ES2 are not overlapped with transmission regions of the pixels so that opening rate of the pixels is not decreased. In other words, an aperture rate of each of the pixels is not decreased due to a location of the common protruded electrode ERC.

In order to maintain the opening rate of the pixels, each of the first signal lines SL1 extended in the first direction Dl includes a branch line BR that is branched from the first signal line SL1 in the second direction D2, as shown in FIG. 7. Alternatively, each of the first signal lines SL1 may include a plurality of branch lines BR. The first sensing electrodes ES1 may be connected to the first signal lines SL1 at the branch lines BR. The common protruded electrodes ERC may be formed in the region corresponding to the black matrix of the opposite substrate 620 in an area corresponding to the branch lines BR of the array substrate 610.

In FIGS. 7 and 8, each of the common protruded electrodes ERC may be formed between a unit pixel part having a (ji−1)-th pixel Pji−1, a ji-th pixel Pji, and a (ji+1)-th pixel Pji+1 and an adjacent unit pixel part, and the black matrix covers the common protruded electrode ERC. Each unit pixel parts includes, for example, the red (R) pixel, the green (G) pixel, and the blue (B) pixel that display red, green, and blue colors, respectively.

Each of the first sensing electrodes ES1 is adjacent to each of the second sensing electrodes ES2 so that each of the common protruded electrodes ERC may be electrically connected to both of the adjacent first and second sensing electrodes ES1 and ES2 when each of the common protruded electrodes ERC is applied with an externally provided pressure PO.

A width of the black matrix corresponding to a location between the unit pixel part having the (ji−1)-th pixel Pji−1, the ji-th pixel Pji and the (ji+1)-th pixel Pji+1 and the adjacent unit pixel part may be adjusted to cover the common protruded electrode ERC between the unit pixel part having the (ji−1)-th pixel Pji−1, the ji-th pixel Pji and the (ji+1)-th pixel Pji+1 and the adjacent unit pixel part.

For example, the first and second sensing electrodes ES1 and ES2 may be formed from a substantially same layer as the pixel electrodes PEji and PEji+1 of the pixels. The first and second sensing electrodes ES1 and ES2 are spaced apart from the (ji+1)-th pixel electrode PEji+1 of the (ji+1)-th pixel by a predetermined distance to decrease an electrical coupling between the (ji+1)-th pixel electrode PEji+1 and the first and second sensing electrodes ES1 and ES2.

In order to decrease the electrical coupling, the (ji+1)-th pixel electrode PEji+1 adjacent to the first and second sensing electrodes ES1 and ES2 may be recessed toward a center of a (ji+1)-th pixel region Paji+1 of the (ji+1)-th pixel electrode PEji+1, as shown in FIG. 7. In other words, the (ji+1)-th pixel electrode PEji+1 adjacent to the first and second sensing electrodes ES1 and ES2 may be indented at a location corresponding to the first and second sensing electrodes ES1 and ES2.

In FIGS. 7 and 8, the first and second signal lines SL1 and SL2 are adjacent to each other, such as near where the branch line BR runs adjacent to the second signal line SL2, and each of the common protruded electrodes ERC makes contact with the adjacent first and second sensing electrodes ES1 and ES2 upon application of an externally provided pressure PO. Thus, a voltage level of one of the second signal lines SL2 for determining x-coordinates of the externally provided pressure PO may be simultaneously changed as a voltage level of one of the first signal lines SL1 for determining y-coordinates of the externally provided pressure PO, thereby detecting a precise position of the externally provided pressure PO.

That is, when a first signal line SL1 for determining y-coordinates is spaced apart from a second signal line SL2 for determining x-coordinates, the first signal line SL1 may not be electrically connected to a first protruded electrode ER1 although the second signal line SL2 is electrically connected to a second protruded electrode ER2. Also, when the first signal line SL1 for determining y-coordinates is spaced apart from the second signal line SL2 for determining x-coordinates, the second signal line SL2 may not be electrically connected to the second protruded electrode ER2 although the first signal line SL1 is electrically connected to the first protruded electrode ER1. However, in FIGS. 7 and 8, each of the first sensing electrodes ES1 corresponding to each of the common protruded electrodes ERC is adjacent to each of the second sensing electrodes ES2 also corresponding to the common protruded electrode ERC so that the adjacent first and second signal lines SL1 and SL2 may be simultaneously electrically connected to the common protruded electrode ERC upon application of the externally provided pressure PO.

Figure 9:
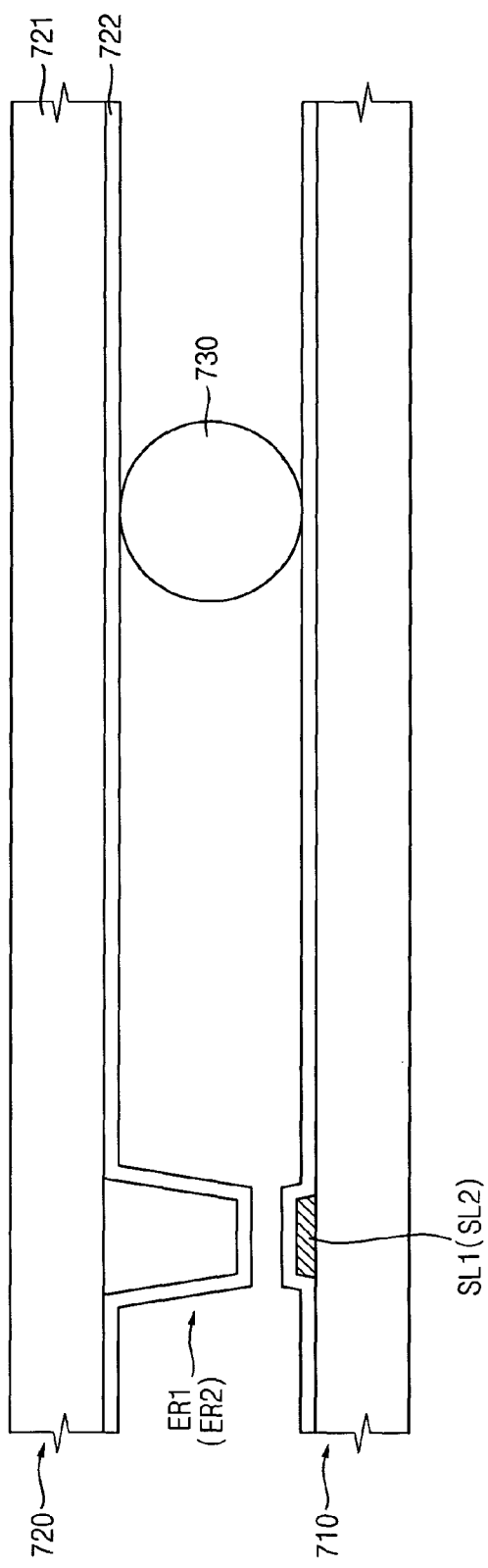
FIG. 9 is a cross-sectional view illustrating an exemplary display panel according to another exemplary embodiment of the present invention.

FIG. 9 is a cross-sectional view illustrating an exemplary display panel according to another exemplary embodiment of the present invention.

Referring to FIG. 9, the display panel 700 includes first and second signal lines SL1 and SL2 formed on an array substrate 710, first and second protruded electrodes ER1 and ER2 formed on an opposite substrate 720, and a spacer that maintains a distance between the array substrate 710 and the opposite substrate 720. The opposite substrate 720 includes an opposite base substrate 721 and a common electrode layer 722 formed on substantially an entire surface of the opposite substrate 720 including the first and second protruded electrodes ER1 and ER2.

The display panel 700 of FIG. 9 is substantially the same as in FIGS. 4 to 6, with the exception of the spacer. Thus, any further explanations concerning elements similar to those in FIGS. 4 and 6 will be omitted in the description of FIG. 9.

In FIG. 9, the spacer includes a ball spacer 730. The ball spacer 730 may maintain a cell gap between the opposite substrate 720 and the array substrate 710. The ball spacer 730 may have a substantially spherical shape so that the ball spacer 730 may have a greater elasticity than the column spacer 230 (shown in FIGS. 4 to 6).

When an externally provided pressure is removed from a portion of the opposite substrate 720 corresponding to each of the first and second protruded electrodes ER1 and ER2, a restoring force of the opposite substrate 720 including the ball spacer 730 having the greater elasticity is increased, thereby easily performing a touch screen function.

Figure 10:
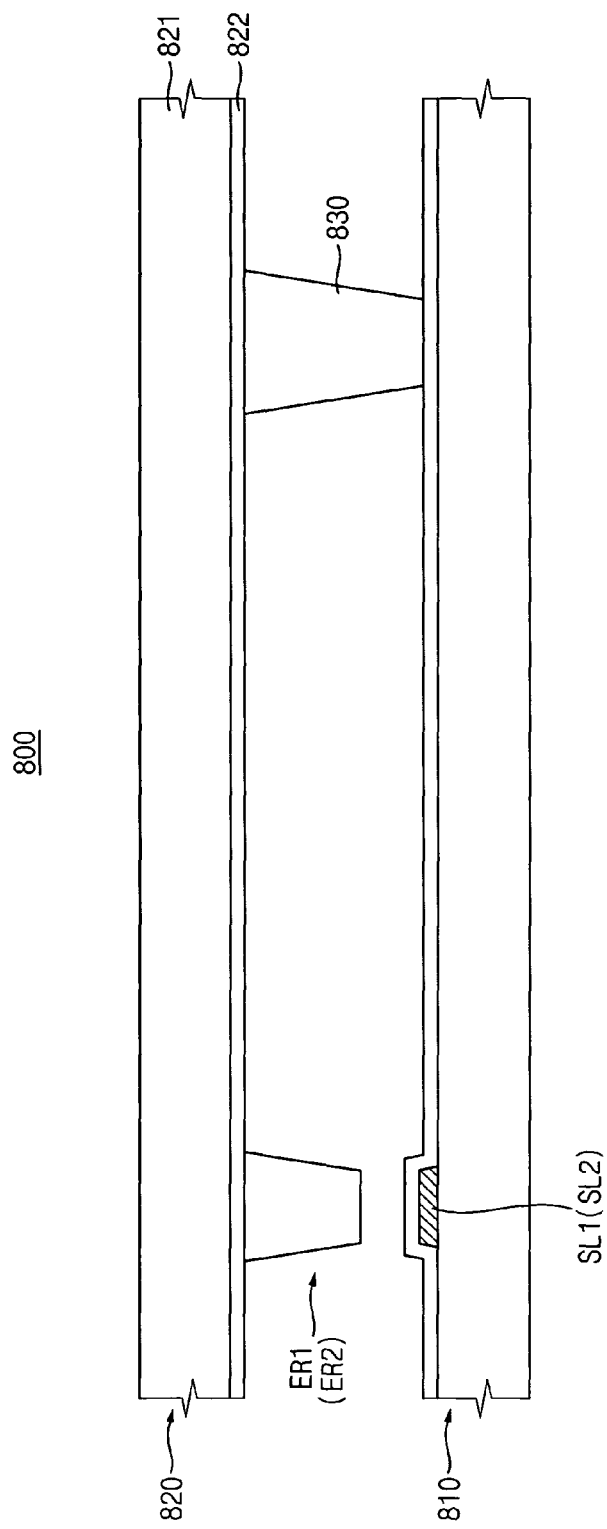
FIG. 10 is a cross-sectional view illustrating an exemplary display panel according to another exemplary embodiment of the present invention.

FIG. 10 is a cross-sectional view illustrating an exemplary display panel according to another exemplary embodiment of the present invention.

Referring to FIG. 10, the display panel 800 includes first and second signal lines SL1 and SL2 formed on an array substrate 810, first and second protruded electrodes ER1 and ER2 formed on an opposite substrate 820, and a spacer 830 that maintains a distance between the array substrate 810 and the opposite substrate 820.

The display panel of FIG. 10 is substantially the same as in FIGS. 4 to 6, with the exception of the first and second protruded electrodes ER1 and ER2. Thus, any further explanations concerning elements similar to those in FIGS. 4 and 6 will be omitted in the description of FIG. 10.

The opposite substrate 820 includes an opposite base substrate 821, a common electrode layer 822, and first and second protruded electrodes ER1 and ER2.

The common electrode layer 822 is formed on the opposite base substrate 821 to cover a substantially entire surface of the opposite base substrate 821. The first and second protruded electrodes ER1 and ER2 may include a conductive material. An end portion of each of the first and second protruded electrodes ER1 and ER2 makes contact with the common electrode layer 822. The first and second protruded electrodes ER1 and ER2 correspond to first and second sensing electrodes that are connected to the first and second signal lines SL1 and SL2, respectively.

When the first and second protruded electrodes ER1 and ER2 are electrically connected to the first and second signal lines SL1 and SL2, respectively, a level of an initial driving voltage Vid applied to the first and second signal lines SL1 and SL2 are changed by a common voltage that is applied to the common electrode layer 822.

In FIGS. 9 and 10, the spacer and the protruded electrodes of the respective display panels include different materials, shapes, or positionings from the spacer and the protruded electrodes of the display panel shown in FIGS. 4 to 6. It should be understood that the display panel of the present invention may include various spacers and protruded electrodes, including varying combinations of spacers and protruded electrodes described herein. For example, the display panel may include a ball spacer and protruded electrodes including a conductive material.

In another example, the display panel may include the spacers and the protruded electrodes shown in FIGS. 9 and 10 and other elements substantially the same as shown in FIGS. 4 to 6. In yet another example, the display panel may include the spacers and the protruded electrodes shown in FIGS. 9 and 10 and other elements substantially the same as shown in FIGS. 7 and 8.

Figure 11:
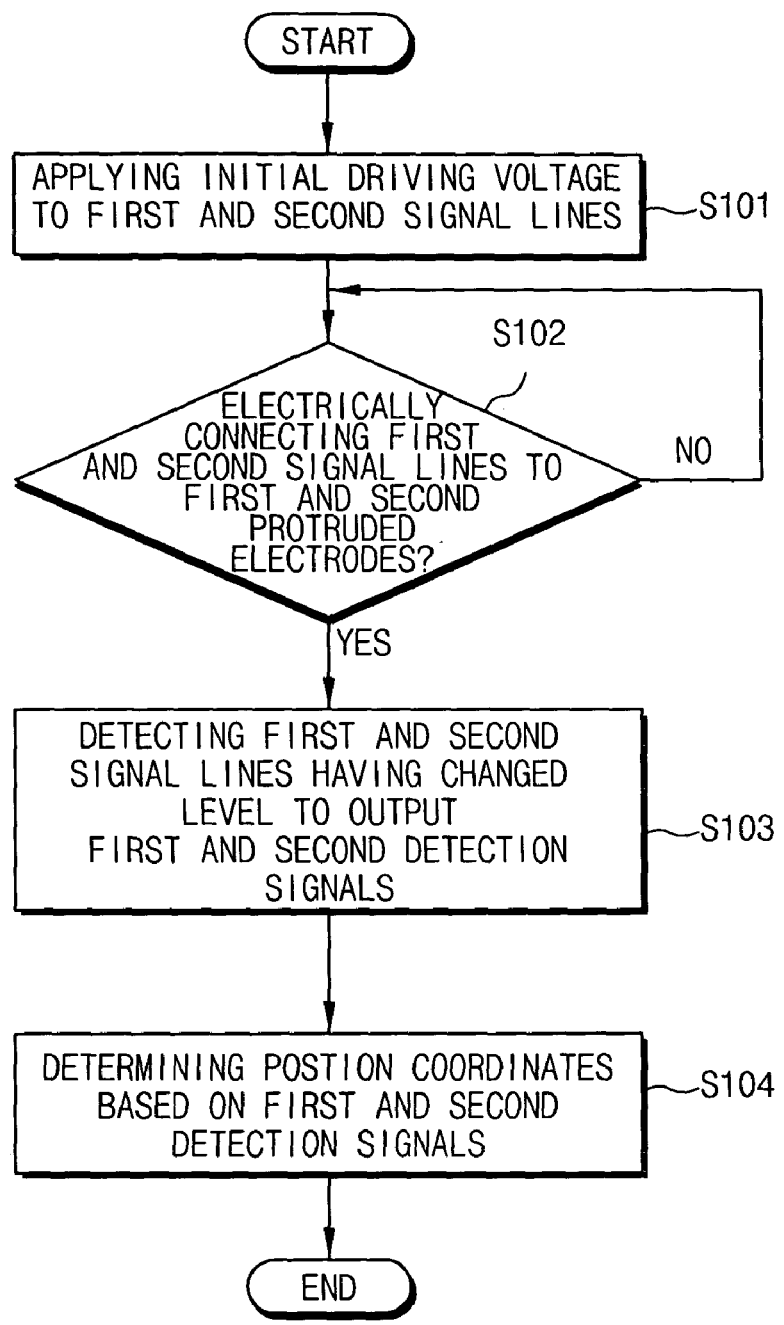
FIG. 11 is a flow chart showing an exemplary method of detecting touch position according to another exemplary embodiment of the present invention.
Figure 12:
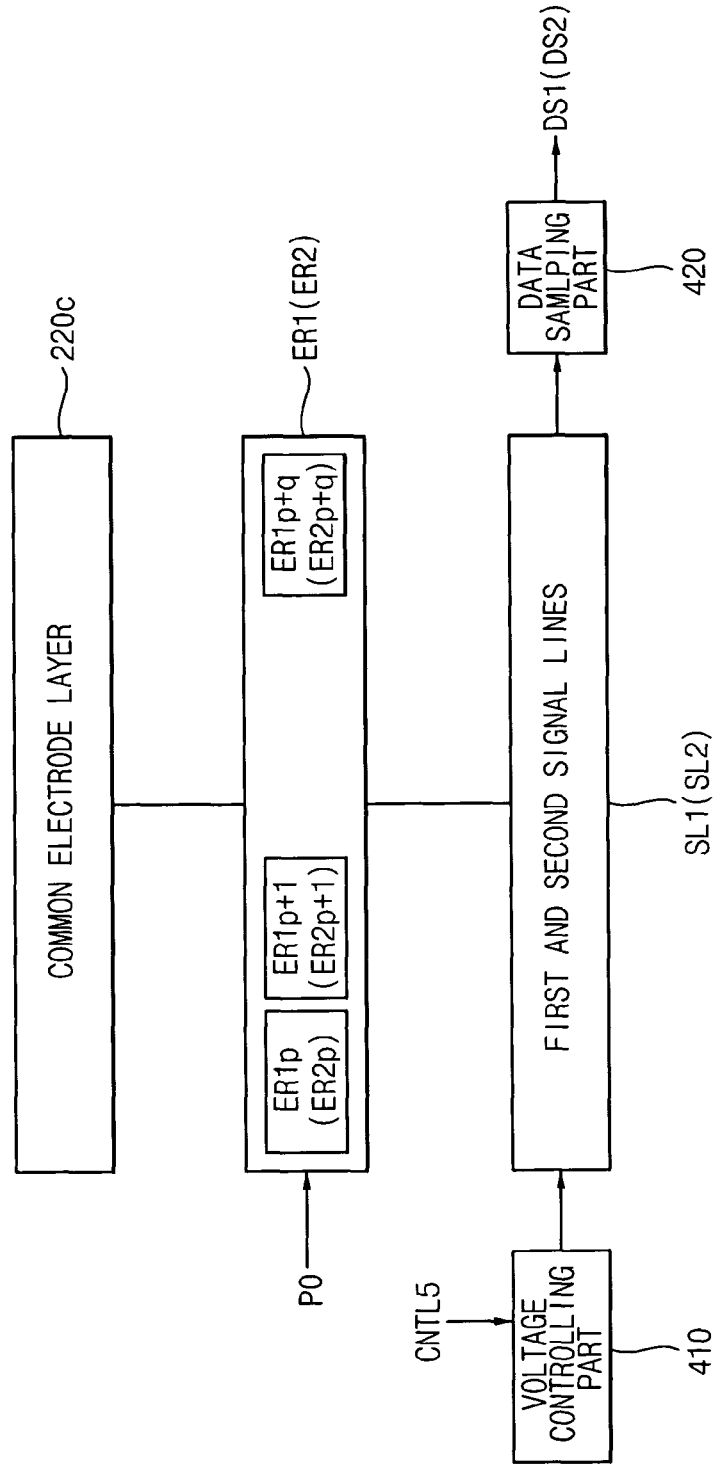
FIG. 12 is a block diagram illustrating an exemplary method of detecting touch position on a portion of an exemplary display device according to another exemplary embodiment of the present invention.

FIG. 11 is a flow chart showing an exemplary method of detecting touch position according to another exemplary embodiment of the present invention. FIG. 12 is a block diagram illustrating an exemplary method of detecting touch position on a portion of an exemplary display device according to another exemplary embodiment of the present invention.

In the exemplary method of detecting touch position of FIGS. 11 and 12, the display device includes the display panel shown in FIG. 3. However, it should be understood that similar methods of detecting touch position may be performed using other display panels including varying embodiments as described above.

Referring to FIGS. 3, 11 and 12, the display panel 200 includes an array substrate 210 and an opposite substrate 220. The array substrate 210 includes a plurality of first signal lines SL1 extended in a first direction D1 and a plurality of second signal lines SL2 extended in a second direction D2 that crosses the first direction D1. The opposite substrate 220 faces the array substrate 210 so that a liquid crystal layer is interposed between the array substrate 210 and the opposite substrate 220. The opposite substrate 220 includes a plurality of first protruded electrodes ER1 and a plurality of second protruded electrodes ER2. The first and second protruded electrodes ER1 and ER2 are protruded from the opposite substrate 220 toward the array substrate 210.

The first and second signal lines SL1 and SL2 are electrically connected to a touch position detecting part 400 (shown in FIG. 1).

In order to detect the touch position, such as a location of an externally provided pressure PO, referring again to FIGS. 1, 3, 11 and 12, the touch position detecting part 400 applies an initial driving voltage Vid having a predetermined level to the first and second signal lines SL1 and SL2.

As shown in block S101 of the method of FIG. 11, a voltage controlling part 410 applies the initial driving voltage Vid outputted from the power supply part 320 to the first and second signal lines SL1 and SL2 based on the fifth control signal CNTL5 outputted from the timing controlling part 310.

The common voltage Vcom is applied to a common electrode layer 220c of the opposite substrate 220 to change arrangement of liquid crystals of the liquid crystal layer.

The display panel 200 may include an input member that may be pressed on the display panel 200. When an externally provided pressure PO is applied to a portion of the opposite substrate 220, the portion of the opposite substrate 220 is bent toward the array substrate 210 so that at least one of the first and second protruded electrodes ER1$p$+$q$ and ER2$p$+$q$ corresponding to the externally provided pressure PO are electrically connected to at least one corresponding first and second signal line SL1 and SL2 that may be adjacent to each other. The first and second protruded electrodes ER1$p$+$q$ and ER2$p$+$q$ are electrically connected to the common electrode layer 220c that receives the common voltage Vcom.

As shown in block S102 of the method of FIG. 11, when the first and second protruded electrodes ER1$p$+$q$ and ER2$p$+$q$ are electrically connected to the first and second signal lines SL1 and SL2, respectively, due to the externally provided pressure PO, a level of the initial driving voltage Vid applied to the first and second signal lines SL1 and SL2 is changed.

As shown by block S103 of the method of FIG. 11, when the level of the initial driving voltage Vid applied to the first signal line SL1 is changed due to the externally provided pressure PO, a data sampling part 420 of the touch position detecting part 400 generates a first detection signal DS1 using the changed level of the initial driving voltage Vid. The first detection signal DS1 corresponds to y-coordinates of a position of the externally provided pressure PO.

As further shown by block S103 of the method, when the level of the initial driving voltage Vid applied to the second signal line SL2 is changed, the data sampling part 420 of the touch position detecting part 400 generates a second detection signal DS2 using the changed level of the initial driving voltage Vid. The level of the initial driving voltage Vid applied to the second signal line may be simultaneously changed with the first signal line SL1. The second detection signal DS2 corresponds to x-coordinates of the position of the externally provided pressure PO.

As shown by block S104 of the method of FIG. 11, the first and second detection signals DS1 and DS2 are applied to a position determining part 500 (shown in FIG. 1). The position determining part 500 processes the y-coordinates and the x-coordinates of the externally provided pressure PO to determine the position of the externally provided pressure PO on the display panel 200, thereby applying data of the y-coordinates and the x-coordinates to a host system for displaying image.

The data of the y-coordinates and the x-coordinates of the input member and instruction assembly are stored in the host system. The host system performs an instruction corresponding to the data of the y-coordinates and the x-coordinates based on the first and second detection signals DS1 and DS2 that are generated using the externally provided pressure PO, and a result of the instruction is displayed on the display panel 200. The position determining part 500 may be integrated into the host system. Alternatively, the host system may perform the touch position determining function of the position determining part 500.

In order to perform the touch position determining function, the touch position detecting part 400 may have a structure described hereafter.

Figure 13:
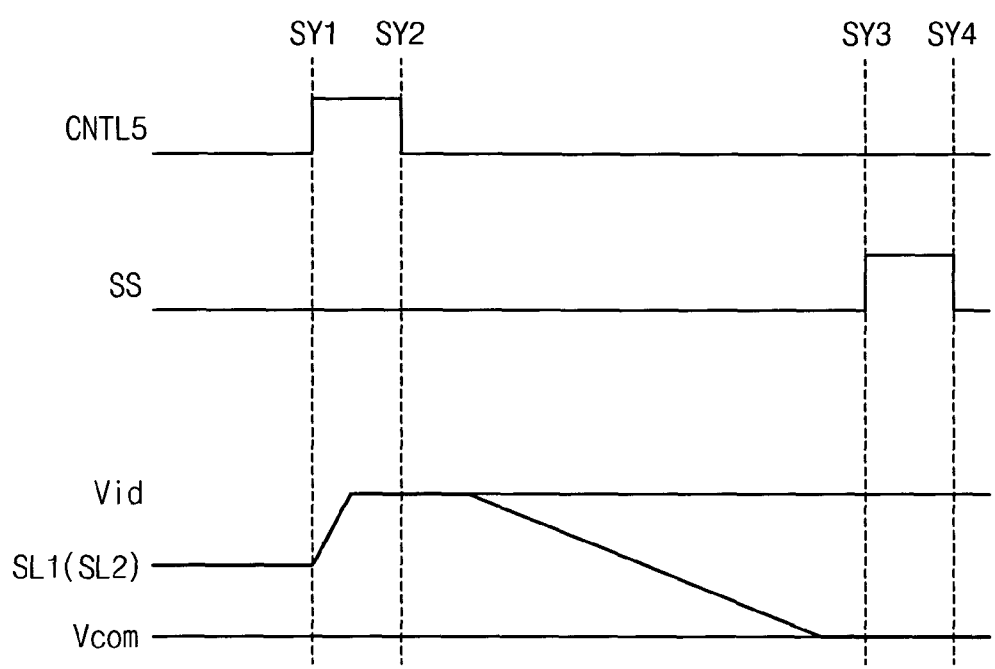
FIG. 13 is a timing diagram illustrating the exemplary method of detecting the touch position in FIG. 11.
Figure 14:
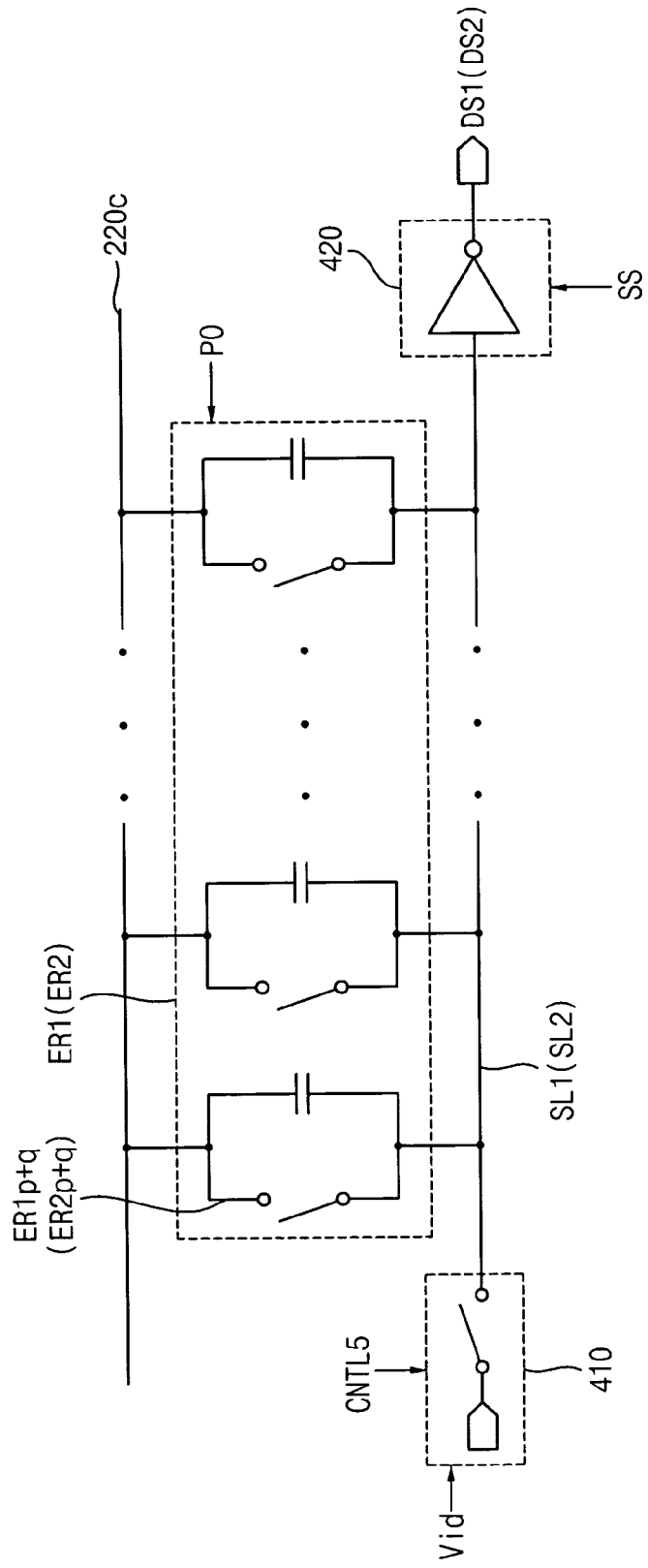
FIG. 14 is a schematic circuit view illustrating an exemplary touch position detecting part according to the exemplary method shown in FIG. 13.

FIG. 13 is a timing diagram illustrating the exemplary method of detecting the touch position in FIG. 11. FIG. 14 is a schematic circuit view illustrating an exemplary touch position detecting part according to the exemplary method shown in FIG. 13.

Referring to FIGS. 12 to 14, a common voltage Vcom is applied to a common electrode layer 220c (a period before SY1). A voltage controlling part 410 is driven based on a fifth control signal CNTL5 outputted from a timing controlling part 310 (shown in FIG. 1), and applies an initial driving voltage Vid to first and second signal lines SL1 and SL2 (during a period between SY1 and SY2).

A first protruded electrode ER1$p$+$q$ of a plurality of first protruded electrodes ER1 and a second protruded electrode ER2$p$+$q$ of a plurality of second protruded electrodes ER2, adjacent to the first protruded electrode ER1$p$+$q$, are electrically connected to the first and second signal lines SL1 and SL2, respectively, based on an externally provided pressure PO so that voltage levels of the first and second signal lines SL1 and SL2 electrically connected to the adjacent first and second protruded electrodes ER1$p+q$ and ER2$p+q$ are changed (during a period between SY2 and SY3).

When the common voltage Vcom has a lower level than the initial driving voltage Vid, a current flows through each of the first and second signal lines SL1 and SL2 to the common electrode layer 220c so that the level of each of the first and second signal lines SL1 and SL2 becomes the level of the common voltage Vcom (during a period between SY3 and SY4). For example, the common voltage Vcom may be about 0V, and the initial driving voltage Vid may be about 5V.

A data sampling part 420 latches the changed level of each of the first and second signal lines SL1 and SL2 based on a sampling signal SS that is outputted from the timing controlling part 310, such as during the time period between SY3 and SY4, and generates first and second detection signals DS1 and DS2.

The data sampling part 420 may further include a latch that receives the sampling signal SS.

For example, a plurality of data sampling parts 420 may be formed on each of the first and second signal lines SL1 and SL2. The voltage controlling part 410 may include a switching element such as a metal oxide semiconductor ("MOS") transistor and may be electrically connected to the first and second signal lines SL1 and SL2.

Figure 15:
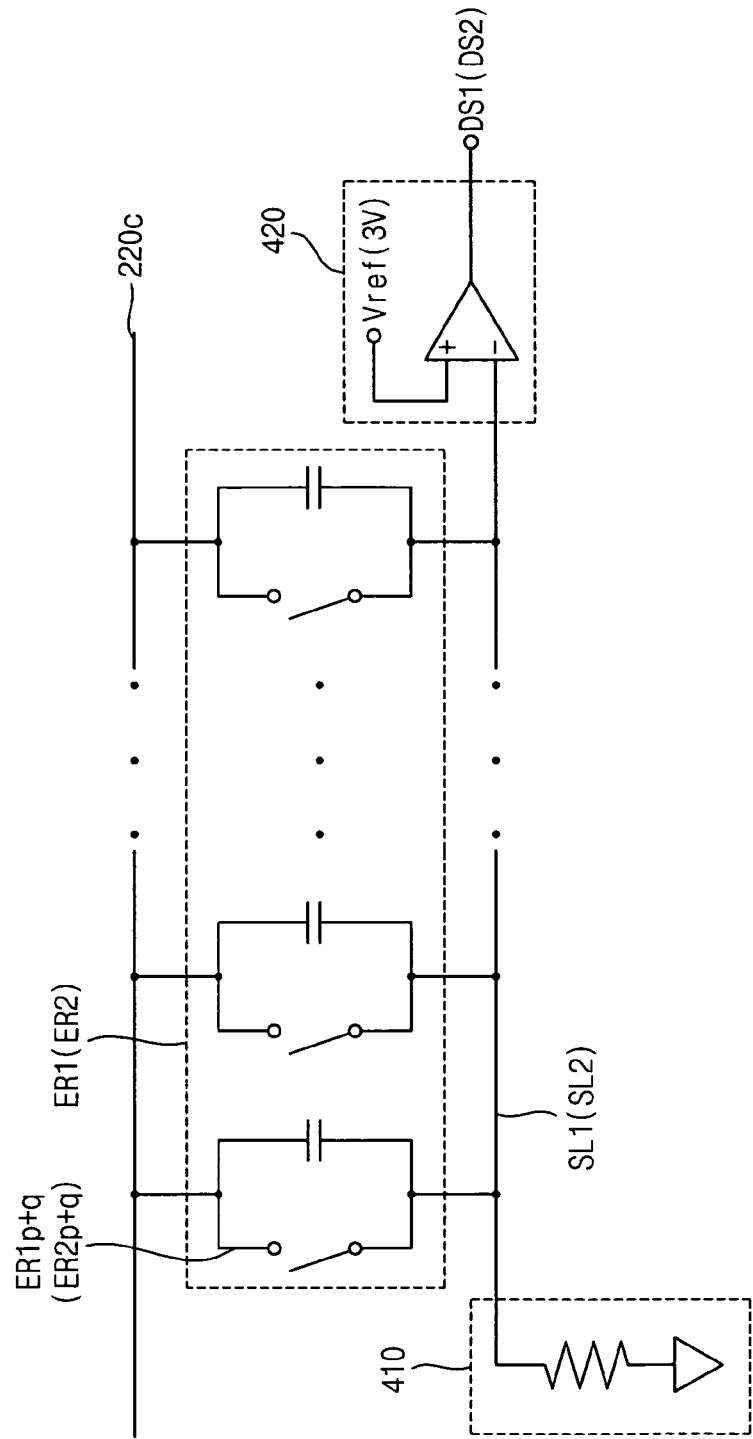
FIG. 15 is a schematic circuit view illustrating another exemplary touch position detecting part according to the exemplary method shown in FIG. 11.

FIG. 15 is a schematic circuit view illustrating another exemplary touch position detecting part according to the exemplary method shown in FIG. 11.

In FIG. 11, the common voltage Vcom has a lower level than the initial driving voltage Vid. Referring to FIG. 15, however, a common voltage Vcom has a relatively higher level than an initial driving voltage Vid.

For example, when the common voltage Vcom and the initial driving voltage Vid may be about 5V and about 0V, respectively, a current flows through the common electrode layer 220c to each of the first and second signal lines SL1 and SL2 so that the level of each of the first and second signal lines SL1 and SL2 becomes the level of the common voltage Vcom.

In FIG. 15, an application of a fifth control signal CNTL5 that controls the voltage controlling part 410 may be omitted. That is, a timing controlling part 310 (shown in FIG. 1) does not need to apply the fifth control signal CNTL5 to the voltage controlling part 410, since the initial driving voltage Vid may be 0V.

A data sampling part 420 compares a predetermined reference signal Vref, e.g. 3V, with the changed level of each of the first and second signal lines SL1 and SL2 to amplify a voltage difference between the reference signal Vref and the changed level of each of the first and second signal lines SL1 and SL2, and generates first and second detection signals DS1 and DS2. Alternatively, the reference signal Vref may be adjusted to increase sensitivity for detecting the variation of the level of each of the first and second signal lines SL1 and SL2.

In addition, the initial driving voltage Vid that is substantially the same as a ground potential GND may be applied to the first and second signal lines SL1 and SL2 to detect the variation of the voltage applied to the first and second signal lines SL1 and SL2.

The data sampling part 420 may include an operational amplifier, and a power supply part 320 (shown in FIG. 1) may generate the reference signal Vref.

According to the exemplary method of detecting the touch position, the protruded electrodes of the opposite substrate are electrically connected to the signal lines of the array substrate based on the externally provided pressure to detect the variation of the common voltage and the initial driving voltage that are applied to the protruded electrodes and the signal lines, respectively. Thus, the coordinates of the touch position, to which the externally provided pressure is applied, is detected.

According to the present invention, the display panel includes the touch screen function so that a thickness of the display panel is decreased. In addition, the touch position is determined based on the variation of the initial driving voltage applied to the first and second signal lines, and thus the display panel advantageously does not require a light sensor dependent on ambient light, so that the touch position is easily detected.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display panel comprising:
   an array substrate including:
   a plurality of gate lines;
   a plurality of data lines crossing the gate lines;
   a plurality of pixels driven by the gate lines and the data lines;
   a plurality of first signal lines extended substantially in parallel with the gate lines;
   a plurality of second signal lines extended substantially in parallel with the data lines;
   an insulation layer covering the first and second signal lines;
   a plurality of first sensing electrodes disposed on the insulation layer and electrically connected to the first signal lines; and
   a plurality of second sensing electrodes disposed on the insulation layer and electrically connected to the second signal lines; and
   an opposite substrate combined with the array substrate interposing a liquid crystal layer there between, the opposite substrate including:
   an opposite base substrate; and
   first and second protruded electrodes protruding from the opposite substrate and disposed overlapping the first and second sensing electrode, respectively,
   wherein the first and second protruded electrodes contact the first and second sensing electrodes, respectively, to be electrically connected to the first and second signal lines, when applied with an externally provided pressure,
   wherein the first and second protruded electrodes electrically are spaced apart from the first and second sensing electrodes, when not applied with an externally provided pressure.

2. The display panel of claim 1, wherein each of the first and second protruded electrodes comprises:
   an insulating part protruded from the opposite base substrate; and
   a common electrode layer covering the insulating part, the common electrode layer further covering the opposite base substrate.

3. The display panel of claim 1, wherein the first and second protruded electrodes comprise:
   a common electrode layer covering a substantially entire surface of the opposite base substrate; and
   a plurality of conductive parts on the common electrode layer.

4. The display panel of claim 1, wherein a thickness of the opposite base substrate is about 0.2 mm to about 0.5 mm.

5. The display panel of claim 1, wherein the array substrate further comprises a plurality of pixel electrodes defining the plurality of pixels, and the first and second sensing electrodes are formed from a substantially same layer as the plurality of pixel electrodes.

6. The display panel of claim 1, wherein the first signal lines further comprises a plurality of branch lines substantially in parallel with the data lines, and the first sensing electrodes are formed on the branch lines.

7. The display panel of claim 6, wherein at least two pixels are formed between adjacent branch lines and adjacent second signal lines.

8. The display panel of claim 6, wherein each of the branch lines and each of the second signal lines are between adjacent pixels.

9. The display panel of claim 8, wherein each of the first protruded electrodes is integrally formed with each of the second protruded electrodes.

10. The display panel of claim 1, further comprising a spacer maintaining a distance between the array substrate and the opposite substrate.

11. The display panel of claim 10, wherein the spacer comprises a column spacer.

12. The display panel of claim 10, wherein the spacer comprises a ball spacer.

13. The display panel of claim 1, wherein a height of each of the first and second protruded electrodes is less than a cell gap between the array substrate and the opposite substrate.

14. A display device comprising:
    a display panel including:
        an array substrate including a plurality of gate lines, a plurality of data lines, a plurality of first signal lines extended substantially in parallel with the gate lines, a plurality of second signal lines extended substantially in parallel with the data lines, an insulation layer covering the first and second signal lines, a plurality of first sensing electrodes disposed on the insulation layer and electrically connected to the first signal lines, and a plurality of second sensing electrodes disposed on the insulation layer and electrically connected to the second signal lines; and
        an opposite substrate combined with the array substrate interposing a liquid crystal layer there between, the opposite substrate including an opposite base substrate, and first and second protruded electrodes protruding from the opposite substrate and disposed overlapping the first and second sensing electrodes, respectively, wherein the first and second protruded electrodes respectively contact the first and second sensing electrodes to be a plurality of protruded electrodes electrically connected to the first and second signal lines when applied with an externally provided pressure, wherein the first and second protruded electrodes are spaced apart from the first and second sensing electrodes, when not applied with an externally provided pressure;
    a panel driving part which applies gate and data signals to the gate and data lines, respectively;
    a touch position detecting part which detects first and second signal lines electrically connected to protruded electrodes to output a detection signal; and
    a position determining part which determines position coordinates of the externally provided pressure based on the detection signal.

15. The display device of claim 14, wherein the panel driving part comprises:
    a gate driving part which applies a plurality of gate signals to the gate lines, respectively;
    a data driving part which applies a plurality of data signals to the data lines, respectively; and
    a timing controlling part which controls timing of the gate and data signals.

16. The display device of claim 14, wherein the touch position detecting part comprises:
    a voltage controlling part which controls application of an initial driving voltage to the first and second signal lines; and
    a data sampling part which detects voltage variations of the first and second signal lines, and outputs a detection signal when the first and second signal lines are electrically connected to the first and second protruded electrodes, respectively, when applied with the externally provided pressure.

17. The display device of claim 16, wherein a common voltage is applied to the first and second protruded electrodes.

18. The display device of claim 16, wherein the data sampling part is electrically connected to each of the first and second signal lines.

19. The display device of claim 18, wherein the data sampling part comprises a latch.

20. The display device of claim 18, wherein the data sampling part comprises an operational amplifier.

21. The display device of claim 14, wherein the touch position detecting part is integrally formed with the panel driving part.

22. A method of detecting touch position on a display device, the method comprising:
    applying an initial driving voltage to first and second sensing electrodes, which are disposed on an insulation layer covering first and second signal lines disposed on an array substrate, and are electrically connected to the first and second signal lines, respectively;
    applying a pressure on an opposite substrate such that first and second protruded electrodes, which protrude from the opposite substrate and disposed overlapping the first and second sensing electrodes, respectively contact the first and second sensing electrodes to be electrically connected to the first and second signal lines, the first and second signal lines receiving a common voltage from the first and second protruded electrodes;
    detecting the first and second signal lines electrically connected to the first and second protruded electrodes and outputting a first detection signal and a second detection signal, wherein a voltage level of the first and second signal lines is changed by a contact with the first and second protruded electrodes; and
    determining position coordinates corresponding to the externally provided pressure based on the first and second detection signals,
    wherein the first and second protruded electrodes are spaced apart from the first and second signal lines, respectively, when not applied with an externally provided pressure.

23. The method of claim 22, wherein applying the initial driving voltage to the first and second sensing electrodes comprises applying the initial driving voltage having a higher level than the common voltage.

24. The method of claim 23, wherein detecting the first and second signal lines electrically connected to the first and second protruded electrodes and outputting the first and second detection signals comprises latching a voltage level at a time when a changed voltage level of the first and second signal lines becomes a voltage level of the common voltage to generate the first and second detection signals.

25. The method of claim 22, wherein applying the initial driving voltage to the first and second sensing electrodes comprises applying the initial driving voltage having a lower level than the common voltage.

26. The method of claim 25, wherein detecting the first and second signal lines electrically connected to the first and second protruded electrodes and outputting the first and second detection signals comprises comparing a reference voltage with a changed voltage level of the first and second signal lines at a time when the changed voltage level of the first and second signal lines becomes a voltage level of the common voltage to amplify a voltage difference between the reference voltage and the changed level of the first and second signal lines, thereby generating the first and second detection signals.

27. The method of claim 22, wherein determining the position coordinates corresponding to the externally provided pressure based on the first and second detection signals comprises determining a crossing point between the first and second signal lines having a changed voltage level based on the first and second detection signals.

28. A display panel comprising:
an array substrate including:
   a gate line;
   a data line crossing the gate line;
   a pixel driven by the gate line and the data line;
   a first signal line extended substantially in parallel with the gate line;
   a second signal line extended substantially in parallel with the data line;
   an insulation layer covering the first and second signal lines;
   a first sensing electrode disposed on the insulation layer and electrically connected to the first signal line; and
   a second sensing electrode disposed on the insulation layer and electrically connected to the second signal line and
an opposite substrate combined with the array substrate interposing a liquid crystal layer there between, the opposite substrate including:
   an opposite base substrate; and
   a protruded electrode protruding from the opposite substrate and disposed overlapping the first and second sensing electrodes,
   wherein the protruded electrode contacts the first and second sensing electrodes to be electrically connected to the first and second signal lines, when applied with an externally provided pressure, and
   wherein the protruded electrode is spaced apart from the first and second sensing electrodes, when not applied with an externally provided pressure.

* * * * *